(12) United States Patent
Takayama et al.

(10) Patent No.: US 7,282,173 B2
(45) Date of Patent: Oct. 16, 2007

(54) TRACK BUSHING AND METHOD AND APPARATUS FOR PRODUCING THE SAME

(75) Inventors: Takemori Takayama, Hirakata (JP); Chigo Okayama, Hirakata (JP); Masayuki Ohishi, Neyagawa (JP); Takeyo Terao, Kyotanabe (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 11/367,424

(22) Filed: Mar. 6, 2006

(65) Prior Publication Data
US 2006/0175742 A1 Aug. 10, 2006

Related U.S. Application Data

(62) Division of application No. 10/479,701, filed as application No. PCT/JP01/04827 on Jun. 7, 2001.

(51) Int. Cl.
*C21D 1/06* (2006.01)
(52) U.S. Cl. ........................ 266/254; 148/570
(58) Field of Classification Search ................ 266/249, 266/252, 254; 148/570, 572
See application file for complete search history.

(56) References Cited

U.S. PATENT DOCUMENTS

| | | | |
|---|---|---|---|
| 3,227,586 A | 1/1966 | Spencer | |
| 3,567,529 A | 3/1971 | Burtnett | |
| 3,997,375 A | 12/1976 | Franceschina et al. | |
| 4,308,037 A | 12/1981 | Meissner et al. | |
| 4,376,528 A | 3/1983 | Ohshimatani et al. | |
| 4,444,604 A | 4/1984 | Martin | |
| 4,803,037 A | 2/1989 | McBain et al. | |
| 4,820,358 A | 4/1989 | Chang | |
| 5,140,118 A | 8/1992 | Catanese et al. | |
| 5,702,667 A | 12/1997 | Pond | |
| 6,048,417 A * | 4/2000 | Pond | 148/570 |
| 6,193,820 B1 | 2/2001 | Girardello et al. | |
| 6,270,595 B1 * | 8/2001 | Takayama et al. | 148/570 |
| 2001/0050121 A1 | 12/2001 | Takayama et al. | |

FOREIGN PATENT DOCUMENTS

| | | |
|---|---|---|
| EP | 0 339 152 A1 | 11/1989 |
| JP | 52-034806 U | 3/1977 |
| JP | 58-031031 A | 2/1983 |
| JP | 58-189327 A | 11/1983 |
| JP | 61-37924 A | 2/1986 |
| JP | 63-016314 A | 11/1988 |
| JP | 01-42528 A | 2/1989 |
| JP | 03-120317 A | 5/1991 |
| JP | 403166320 A * | 7/1991 |

(Continued)

Primary Examiner—Scott Kastler
(74) Attorney, Agent, or Firm—Rader Fishman & Grauer PLLC; Ronald P. Kananen

(57) ABSTRACT

Quenched layers are formed without irregularities on the inner circumferential surface of a track bushing having a small inside diameter or on the inner circumferential surfaces of two or more track bushings which are subjected to quenching in an overlapped condition. To introduce a cooling medium for cooling the inner circumferential surface of the track bushing, a guide tube having an outside diameter smaller than the inside diameter of the track bushing is disposed on the side of the inner circumferential surface and the cooling medium introduced by the guide tube is diverted by a diverting member having a spherical or similar curved surface, such that the cooling medium is allowed to flow in a direction substantially parallel with an axial direction of the track bushing 1 within a space defined by the outer circumferential surface of the guide tube and the inner circumferential surface of the track bushing, thereby performing laminar flow cooling.

6 Claims, 24 Drawing Sheets

(a)

FOREIGN PATENT DOCUMENTS

| | | |
|---|---|---|
| JP | 10-204534 A | 8/1998 |
| JP | 11-061264 A | 3/1999 |
| JP | 11-131143 A | 5/1999 |
| JP | 11-236619 A | 8/1999 |
| JP | 2000-073121 A | 3/2000 |
| JP | 2001-064729 A | 3/2001 |
| JP | 2001-098326 A | 4/2001 |
| JP | 2001-240914 A | 9/2001 |

\* cited by examiner

| TRACK BUSHING CODE | D | d | L |
|---|---|---|---|
| A | 41 | 24 | 81 |
| B | 59 | 38 | 138 |
| C | 98 | 61 | 212 |

FIG. 14
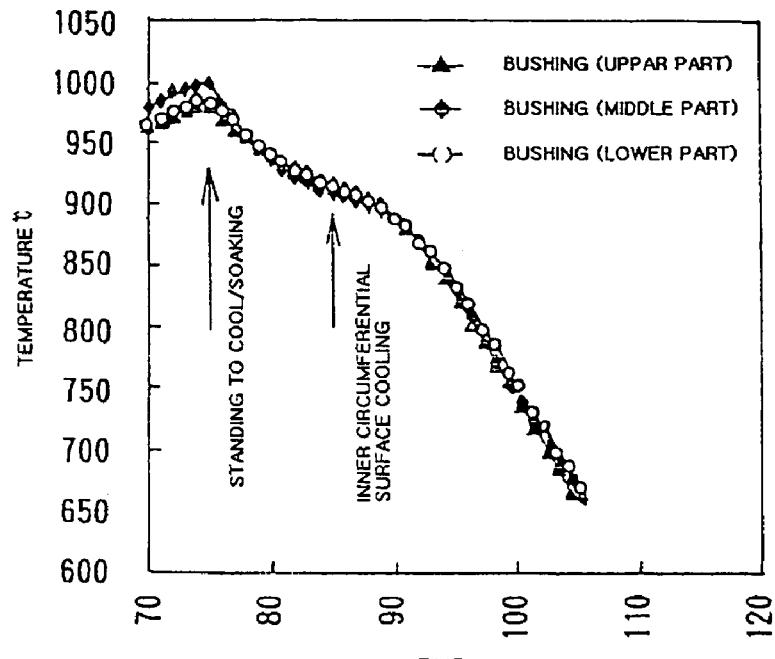
(a) LAMINAR FLOW COOLING (200 LITERS/MIN)
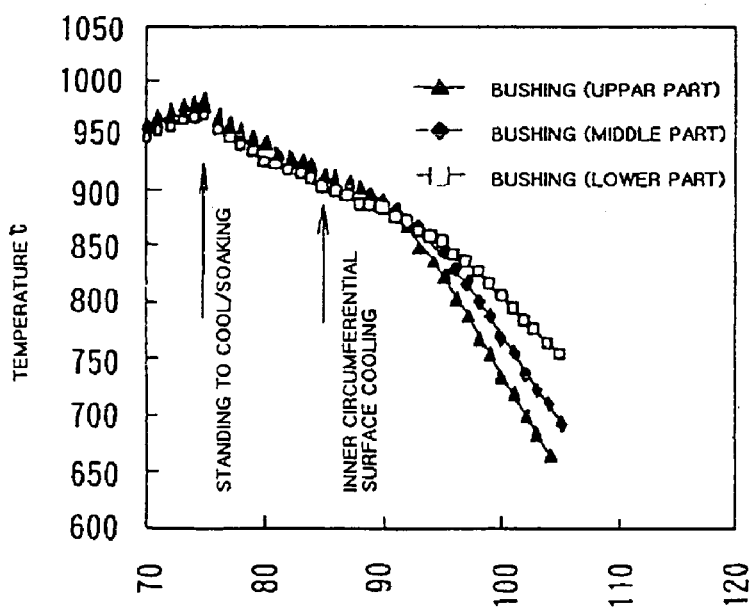
(b) SPRAY COOLING (200 LITERS/MIN)

DISTANCE FROM OUTER CIRCUMFERENTIAL SURFACE (mm)

TRACK BUSHING AND METHOD AND APPARATUS FOR PRODUCING THE SAME

This application is a divisional application of U.S. patent application Ser. No. 10/479,701 filed on Dec. 5, 2003, which is based on International Application No. PCT/JP01/04827 filed on Jun. 7, 2001, the entire content being incorporated by reference.

TECHNICAL FIELD

The invention relates to a track bushing for use in construction machines such as bulldozers, and a method and apparatus for producing the same. More particularly, the invention relates to a track bushing excellent in wear resistance and impact fatigue resistance, and a method and apparatus for producing such a track bushing at low cost, by use of a simpler means.

BACKGROUND ART

A known crawler belt 51 for use in a construction machine or the like comprises assemblage of parts such as shown in FIG. 23. Among them, a track bushing 52 is required to have wear resistance at its inner and outer circumferential surfaces as well as high strength and toughness as a bushing, because it engages sprocket teeth for transmitting rotational movement from final reduction gears and functions to rotate the crawler belt 51. In a high speed running condition, there have been used pre-lubricated crawler belts containing a lubricant in a gap between a track pin 53 and the track bushing 52 in order to prevent occurrence of seizure between them. In this case, not only the wear resistance of the outer circumferential surface which comes into direct contact with the sprocket needs to be ensured, but also the lubricant must be sealed by a flat sealing portion 61 at an end face of the track bushing and a dust seal (lip seal) 62, and therefore, at least the contact area of the flat sealing portion 61 with which the dust seal 62 comes into contact is required to be sufficiently hardened by quenching (the contact area after wear is the area having a depth about one-half the wall thickness t from the outer circumferential surface).

To attain the required properties, any one of the following measures is usually taken in the production of such a bushing.

① Case hardening steel is subjected to carburization treatment to form martensitic inner and outer surface layers having high hardness, whereby high wear resistance and strength are ensured (see Japanese Patent Publication (Kokoku) Gazette No. 52-34806).

② The inner and outer circumferences of a refined bushing material, which has been prepared from medium carbon steel, are respectively subjected to induction hardening to form martensite of high hardness in the inner and outer surface layers. Alternatively, after deep quenching has been done by induction hardening from the outer circumferential surface, induction hardening is carried out from the inner circumferential surface to form a V-shaped tempered martensitic quench-hardened case between the outer and inner circumferential surface quench-hardened cases. With either of the above processes, desired wear resistance and strength are obtained (Japanese Patent Publication (Kokoku) Gazette No. 63-16314).

③ A bushing material (medium carbon steel) is once heated to a quenching temperature or more. After a specified time has elapsed after preceding cooling of the inner circumferential surface, cooling from the outer circumferential surface is stopped. Alternatively, the inner circumferential surface is cooled while heating the outer circumferential surface by induction heating and after an elapse of a specified time, the heating of the outer circumferential surface is stopped to start cooling of the outer circumferential surface. With such a series of quenching processes, quench-hardened cases respectively extending from the outer and inner circumferential surfaces toward the wall thickness center of the bushing are formed such that a smooth, U-shaped hardness distribution providing an unhardened quenched layer to be left between the quench-hardened cases is obtained and such that the hardened case formed in the outer circumferential surface is deeper than the hardened case formed in the inner circumferential surface. This provides a track bushing having excellent wear resistance and an inexpensive method of producing such a track bushing ((Japanese Patent Publication (Kokai) Gazette Nos. 11-61264 and 11-236619).

The carburization method ① produces a track bushing having good functionality as a pre-lubricated bushing because the end faces of the bushing are uniformly carburization hardened, but presents the problem that it takes a long time to carburize because the carburization-hardened case needs to be deepened in order to increase the wear resistance of the outer circumferential cylindrical surface, and use of a large amount of carburization gas leads to increased cost. In addition, where a large-sized track bushing having a great wall thickness is produced by the carburization method ①, the depth of the hardened case must be great in view of strength and wear resistance, which results in a decrease in yield and high cost. Further, since carburization heating of the inner and outer circumferential surfaces takes a long time, a grain boundary oxidation layer or imperfectly quenched layer of several tens of μm is formed in the inner and outer circumferential surfaces so that fatigue strength and impact resistance properties are likely to degrade.

The induction hardening method ② has been improved over the carburization method ① in terms of cost, but disadvantageously requires two quenching processes, i.e., quenching from the inner and outer circumferential surfaces, so that it cannot be regarded as a satisfactory thermal treatment having improved productivity and cost performance. Additionally, in this induction hardening method, irregularities and omissions in quenching of the end faces of the pre-lubricated track bushing are unavoidable and therefore there arises a problem in ensuring the wear resistance of the end face serving as a dust seal face for preventing penetration of earth and sand into the inner circumference section of the bushing.

The method ③ in which the outer circumferential surface is cooled after preceding cooling of the inner circumferential surface, has the advantage that a track bushing excellent in wear resistance can be produced at very low cost by one quenching operation, but presents the drawback that if spray cooling is employed for cooling the inner circumferential surface of a cylindrical tube of small inside diameter, satisfactory cooling performance and uniformity cannot be ensured, because a surface to be cooled is usually positioned at a distance apart from the nozzle, the distance being about 10 times the bore diameter of the nozzle, in order to obtain an increased heat transfer coefficient and because the ability to discharge spray water is poor. Quenching irregularities in the inner circumferential surface are unavoidable particularly where the method is applied to a track bushing having a very small inside diameter or where, with the intention of attaining increased productivity, the inner circumferential surfaces of two or more track bushings are quenched with their end faces overlapping each other. As a result, a satisfactory improvement in productivity nor cost reduction cannot be achieved.

In the method disclosed in Japanese Patent Publication (Kokai) Gazette No. 11-236619 in which after a whole bushing material has been once heated, by induction heating from the outer circumferential surface, to a quenching temperature, preceding cooling of the inner circumferential surface is carried out while continuing heating of the outer circumferential surface, and after an elapse of a specified time, the heating of the outer circumferential surface is stopped to cool the outer circumferential surface, the time required for heating is longer than the time required for cooling and as heating speed increases, the outer circumferential surface of the track bushing is more heated than the inner circumferential surface, resulting in increased susceptibility to cracking at the time of quenching. This is the cause of hindrance to the realization of satisfactory productivity and stable quality. If heating is excessively done, it adversely affects the service life of the jigs for supporting the track bushing, because the jigs are also repeatedly cooled by the quenching medium after being heated.

Further, where the inner circumferential surface quenching is applied to two or more track bushings with their end faces overlapping each other as described earlier, a stable quench-hardened case cannot be formed in the flat sealing portions at both end faces of the track bushing because of the overlapping, so that this method cannot be applied to pre-lubricated bushings.

In addition, where spray cooling is adapted for cooling the inner circumferential surface, it is difficult to completely shut off a leakage of the cooling medium for the inner circumferential surface from the gap between each partition board and an end face of the bushing, the partition boards being in contact with both ends of the track bushing to separate water flows on the inner circumferential surface side and on the outer circumferential surface side from each other. Therefore, the above-described irregularities and omissions cannot be completely prevented in the quenched portions of the end faces of the pre-lubricated track bushing, so that there arises a need for an inspection for checking the wear resistance of the end faces which serve as the dust seal faces for preventing the penetration of earth and sand into the bore of the track bushing.

Even if a quench-hardened case can be formed with high productivity by induction hardening, a large-scale tempering furnace must be involved in the low temperature tempering process carried out subsequently to the quenching operation, which disadvantageously results in a large scale production line. In the case of induction tempering, tempering heating from the inner and outer circumferential surfaces becomes necessary, entailing unsatisfactory productivity.

The invention has been directed to overcoming the foregoing drawbacks and a primary object of the invention is therefore to provide a track bushing and its production method and apparatus, according to which inner circumferential surface cooling is carried out by an intratube laminar flow of a cooling medium so that a quenched case can be uniformly formed in the inner circumferential surface of a track bushing of small inside diameter or two or more track bushings being quenched in an overlapped manner, thereby achieving improvements over the carburization treatment and the induction quenching treatment in terms of productivity and cost.

Another object of the invention is to provide a track bushing production method and apparatus which are applicable to a pre-lubricated track bushing by virtue of the arrangement in which the inner circumferential surface of the bushing is cooled by an intratube laminar flow in order to completely shut off a leakage of the cooling medium for the inner circumferential surface from the gap between each end face of the track bushing and a partition jig for water-flow separation which is in contact with each end face of the bushing, and in which the speed of cooling from the inner circumferential surface in the neighborhood of both end faces of the bushing is slowed down by the partition jigs, thereby quench-hardening the flat sealing portions of the end faces.

The invention can obviate the need for heating from the inner circumferential surface and enables reliable quenching of the inner circumferential surface of a long cylindrical steel pipe of small inside diameter, and therefore another object of the invention is to provide a method and apparatus for producing, at low cost, a cylindrical part for general purpose which requires wear resistance and strength.

Still another object of the invention is to provide a method and apparatus for producing, at low cost, a track bushing having satisfactory toughness and wear resistance, in which a tempering treatment applied to a track bushing after quenching is eliminated or simplified. This method and apparatus are designed such that, in a series of quenching operations wherein preceding cooling from the inner circumferential surface is effected while carrying out induction heating from the outer circumferential surface and after an elapse of a specified time, cooling from the outer circumferential surface is carried out, a series of quenching processes is added in which during the additional induction heating from the outer circumferential surface or during the time from when the induction heating is stopped until when the outer circumferential surface cooling starts, the cooling from the inner circumferential surface is stopped for a specified time; the inner circumferential surface is tempered within a short time by heat diffusion from the outer circumferential surface to the inner circumferential surface; and the inner circumferential surface is cooled again, and after an elapse of a specified time, the cooling from the outer circumferential surface is carried out, whereby the quench-hardened inner circumferential surface layer is made to have a tempered martensitic structure, and whereby satisfactory toughness and wear resistance are achieved by eliminating the tempering of the quench-hardened outer circumferential surface layer or by effecting induction tempering from the outer circumferential surface within a short time.

DISCLOSURE OF THE INVENTION

A first aspect of the invention resides in that the surface layers of flat sealing portions at both end faces of a track bushing are respectively quench-hardened to a depth no less than one-half the wall thickness of the bushing from the outer circumferential surface, by use of partition jigs used for separating an inner circumferential cooling medium from an outer circumferential cooling medium such that when cooling the inner circumferential surface of the track bushing, the cooling of the inner circumferential surface is speeded down in the neighborhood of both end faces of the bushing and both end faces are effectively heated by additional induction heating from the outer circumferential surface. In addition, another partition jig having the same principle is interposed between two track bushings, whereby pre-lubricated track bushings requiring end face quench-hardened cases can be quenched and, in consequence, considerably improved productivity can be achieved.

Herein, the additional induction heating from the outer circumferential surface is effected such that after the track bushing is entirely heated to a temperature at which the bushing is quenchable (quenching temperature), the outer circumferential surface is heated so as to be kept at the quenching temperature (this heating process is called "additional heating"), while the inner circumferential surface of the track bushing being subjected to preceding cooling, or alternatively such that a series of quenching processes is applied, as described later, to a track bushing which has been shifted to a quenching system after heated by a separated heating furnace or induction heating system. The purpose of the additional heating is as follows.

(1) Local temperature irregularities are prevented from occurring at the outer circumferential surface, the irregularities being likely to occur during the shifting of the track bushing to the quenching system.

(2) The temperature of the outer circumferential surface of the track bushing which has been heated in a furnace is increased, so that even if the preceding cooling of the inner circumferential surface takes a longer time, the temperature of the outer circumferential surface can be prevented from decreasing too much; a layer which remains unhardened in spite of quenching (hereinafter referred to as "unhardened quenched layer" can be stably formed inside the wall of the bushing; and an outer circumferential surface quench-hardened case can be easily formed.

(3) The quench-hardened case in the outer circumferential surface of the track bushing is tempered.

To sum it up, there is provided a method of producing a track bushing according to the first aspect of the invention wherein, in a series of quenching processes in which by use of a quenching system capable of carrying out induction heating from the outer circumferential surface of a track bushing and capable of independently carrying out inner circumferential surface cooling and outer circumferential surface cooling while pressing a partition jig against each end face of the track bushing such that a cooling medium for the inner circumferential surface of the track bushing and a cooling medium for the outer circumferential surface do not interfere with each other, after setting a track bushing material, which has been entirely heated to a quenching temperature by induction heating from the outer circumferential surface or by another process, in the quenching system capable of additional induction heating from the outer circumferential surface, preceding cooling of the track bushing material from the inner circumferential surface is carried out and after an elapse of a specified time, cooling from the outer circumferential surface is carried out, or alternatively, preceding cooling from the inner circumferential surface is carried out while effecting induction heating from the outer circumferential surface and after an elapse of a specified time, the induction heating from the outer circumferential surface is stopped to effect cooling, by speeding down the cooling of the inner circumferential surface in the neighborhood of both end faces of the track bushing and/or by use of partition jigs having such a shape that both end faces can be effectively heated by the additional induction heating from the outer circumferential surface, quench-hardened cases extending from the outer and inner circumferential surfaces, respectively, to the wall center of the track bushing are formed, with an unhardened quenched layer left between the quench-hardened cases on an inner circumferential surface side and an outer circumferential surface side, such that the quench-hardened case on the outer circumferential surface side is deeper than the quench-hardened case on the inner circumferential surface side, such that the unhardened quenched layer has a structure containing one or more selected from ferrite, pearlite and bainite which precipitate in the course of cooling from the quenching temperature, and such that the surface layers of flat sealing portions at both end faces of the track bushing are respectively quench-hardened to a depth no less than one-half the wall thickness of the track bushing from the outer circumferential surface.

A second aspect of the invention resides in that, in the course of the preceding cooling from the inner circumferential surface which is effected while carrying out the additional induction heating from the outer circumferential surface or after finishing the additional induction heating, the preceding cooling is stopped for a short time to disperse heat from the outer circumferential surface side to the inner circumferential surface side and then, cooling of the outer circumferential surface and re-cooling of the inner circumferential surface are effected, whereby a quench-hardened case having a martensitic structure is formed on the inner circumferential surface by short-time high temperature tempering and a harder quench-hardened case of martensitic structure is formed on the outer circumferential surface.

According to the second aspect of the invention, there is provided a method of producing a track bushing wherein, in a series of quenching processes in which by use of a quenching system capable of carrying out induction heating from the outer circumferential surface of a track bushing and capable of independently carrying out inner circumferential surface cooling and outer circumferential surface cooling while pressing a partition jig against each end face of the track bushing such that a cooling medium for the inner circumferential surface of the track bushing and a cooling medium for the outer circumferential surface do not interfere with each other, after setting a track bushing material, which has been entirely heated to a quenching temperature by induction heating from the outer circumferential surface or by another process, in the quenching system capable of additional induction heating from the outer circumferential surface, preceding cooling of the track bushing material from the inner circumferential surface is carried out, or cooling from the inner circumferential surface is effected while carrying out induction heating from the outer circumferential surface and after an elapse of a specified time, cooling from the outer circumferential surface is carried out, or alternatively, the induction heating from the outer circumferential surface is stopped to effect cooling, by adding a step in which during the induction heating from the outer circumferential surface or during the time from when the induction heating is stopped until when the cooling from the outer circumferential surface is finished, the cooling from the inner circumferential surface is stopped and the inner circumferential surface is tempered within a short time by heat diffusion from the outer circumferential surface to the inner circumferential surface, quench-hardened cases extending from the outer and inner circumferential surfaces, respectively, to the wall center of the bushing are formed, with an unhardened quenched layer left between the quench-hardened cases on an inner circumferential surface side and an outer circumferential surface side, such that the quench-hardened case on the outer circumferential surface side is deeper than the quench-hardened case on the inner circumferential surface side, such that the unhardened quenched layer has a structure containing one or more selected from ferrite, pearlite and bainite which precipitate in the course of cooling from the quenching temperature, and such that the inner circumferential surface quench-hardened case has a tempered martensitic structure.

In the invention, the cooling from the inner circumferential surface is stopped during the induction heating from the outer circumferential surface or during the time from when the induction heating is stopped until when the cooling from the outer circumferential surface starts, and after the cooling from the inner circumferential surface is stopped and the tempering of the inner circumferential surface is done within a short time by heat diffusion from the outer circumferential surface to the inner circumferential surface, re-cooling of the inner circumferential surface may be effected.

In each aspect, the outer circumferential surface is preferably tempered within a short time by induction heating.

In each aspect, the jigs for dividing the inner circumferential surface cooling medium from the outer circumferential surface cooling medium may be respectively pressed against the flat sealing portions and/or chamfered inner circumferential surface portions at both end faces of the track bushing so that leakage of the mediums at their contact portions is minimized.

If the preceding cooling of the inner circumferential surface is stopped for a short time, the preceding cooling being effected while carrying out the additional induction heating from the outer circumferential surface or after finishing the additional induction heating, heat on the outer circumferential surface side is diffused to the inner circumferential surface side so that the temperature of the inner circumferential surface side increases. In this case, if quenched martensite is already formed on the inner circumferential surface side during the preceding cooling of the inner circumferential surface, the martensite is rapidly tempered so that it gains toughness. For instance, after a track bushing having a wall thickness of 8 mm has been entirely heated to 950° C. using a high frequency heating source of 6 kHz, cooling of the inner circumferential surface by a laminar flow of water is done for 5 seconds while carrying out additional induction heating from the outer circumferential surface to keep the temperature of the outer circumferential surface to 950° C. During interruption of the induction heating and the cooling of the inner circumferential surface for 1 second, the temperature of the inner circumferential surface is raised from about 150° C. to 500-600° C. by the heat flow from the outer circumferential surface side, thus carrying out re-heating and tempering. Thereafter, cooling of the outer circumferential surface and re-cooling of the inner circumferential surface are effected at the same time, so that a quench-hardened case of martensitic structure which has been tempered at high temperature for a short time is formed on the inner circumferential surface and a quench-hardened case of harder martensitic structure is formed on the outer circumferential surface. By utilizing this, a track bushing can be produced without applying another process of low temperature tempering treatment to the inner circumferential surface. In cases where the harder martensite of the outer circumferential surface needs toughness, toughness can be attained only by induction tempering treatment applied to the outer circumferential surface, and therefore there is no need to use the conventional large-scaled low temperature tempering equipment. It is apparent that the short time tempering treatment by induction heating using the present quenching system brings about significant cost reduction and markedly improved productivity.

For forming a quench-hardened case in the outer circumferential surface, the power supplied when the additional induction heating from the outer circumferential surface is carried out while continuing the preceding cooling of the inner circumferential surface after heating of the entire track bushing from its outer circumferential surface by induction heating should meet such a condition that the temperature of the outer circumferential surface is made to be at least equal to or more than the A3 line temperature by cooling from the inner circumferential surface. Usually, the temperature of the outer circumferential surface is maintained at 800° C. or more. To realize this, it is preferable to ensure the good quality of the outer circumferential surface quench-hardened case by automatically measuring the temperature of the outer circumferential surface while cooling the outer circumferential surface. It is very effective in view of quality management to provide the production line equipment with this function. As a method of measuring the temperature of the outer circumferential surface, non-contact measurement by use of a photo-thermometer and contact measurement by use of a thermocouple are effective.

When carrying out the additional induction heating from the outer circumferential surface, it is preferable to employ a frequency of at least 3 kHz or more, because where the track bushing is thin, namely, 10 mm in wall thickness and induction heating is done with a frequency of 1 kHz for instance, the depth of heat penetration caused by the induction heating reaches the inner circumferential surface. Heating with high heat penetration depth and low frequency is preferred for the overall heating, whereas heating with high frequency is preferred for the additional induction heating. Accordingly, two power sources having different frequencies or a power source which can generate two kinds of frequencies may be preferably used. It is therefore apparently desirable in view of power saving, productivity and quality that a track bushing be first entirely heated with low frequency in a different process and then placed in a quenching system to undergo additional heating with high frequency. However, taking account of productivity and plant investment, it is preferable that a high-frequency power source having one kind of frequency be effectively used for both the overall heating and the additional heating. In this case, it is preferable in view of frequency and the depth of heat penetration that a power source having 1 to 20 kHz be used according to the wall thickness (about 6 to 30 mm) of the track bushing to be treated.

When the outer circumferential surface is heated while carrying out the preceding cooling of the inner circumferential surface, martensite is formed up to a specified depth in the inner circumferential surface and pearlite transformation occurs in a deeper region in the annular wall section. These regions are ferromagnetic and the depth of heat penetration in these regions decreases to about one thirtieth the depth of heat penetration in a paramagnetic austenitic state, so that the influence of frequency is considered to be not so remarkable as described earlier (The approximate expression of the depth of penetration p (mm) of $\alpha Fe$ is $p=16/(\sqrt{f})$ and the approximate expression of the depth of penetration p (mm) of $\gamma Fe$ is $p=500/\sqrt{f}$). Note that f=frequency (Hz)). For obtaining the approximated depth of heat penetration, the above-described determination of frequency may be used as a reference.

As explained in the foregoing description of the first and second aspects, the quenching operation (Time Shift Quench (TSQ)), in which preceding cooling of the inner circumferential surface of a track bushing is done and after an elapse of a specified time, the outer circumferential surface is cooled, is a technique in which after a quench-hardened case has been formed on the inner circumferential surface side by preceding cooling of the inner circumferential surface and ferrite, pearlite and bainite have been formed in regions closer to the center, a quench-hardened case is formed on the outer circumferential surface side by cooling of the outer circumferential surface. If the wall thickness of the track bushing is thin, the outer circumferential surface is likely to be cooled before ferrite, pearlite and bainite are formed or sufficiently formed. Therefore, heating temperature for the entire track bushing is preferably set as high as possible (e.g., 900 to 1,000° C.). In cases where the entire track bushing is heated in a furnace in another process, it is preferable to reheat the track bushing from the outer circumferential surface within a short time by use of a induction heater provided for the quenching system.

As explained in the foregoing description of the first and second aspects, the quenching operation (Time Shift Induction Quench (TSIQ)), in which preceding cooling of the inner circumferential surface of a track bushing is done while carrying out additional induction heating from the outer circumferential surface and after an elapse of a specified time, the additional induction heating from the outer circumferential surface is stopped to start cooling of the outer circumferential surface, is preferable because additional heating by inducing high frequency from the outer circumferential surface is effected in order to prevent the outer circumferential surface from being cooled by the preceding cooling of the inner circumferential surface (such cooling occurs in TSQ) so that soft ferrite, pearlite and bainite can be sufficiently formed in the wall of the bushing while a deeper quench-hardened case can be formed on the outer circumferential surface side even in cases where the wall of the track bushing is thin and where the hardenability of the steel used as the bushing material is high.

A third aspect of the invention resides in that "an intratube flow cooling method" is carried out in order to form an even uniform quench-hardened case in the inner circumferential surface in the case where a track bushing having a smaller inside diameter is produced or in order to form an even uniform quench-hardened case in the inner circumferential surface in the case where a long cylindrical body having a small inside diameter and composed of two or more track bushings with their end faces overlapping with each other is produced with a view to attaining improved productivity. In the intratube flow cooling method (hereinafter simply referred to as "laminar flow cooling" because cooling is carried out with a laminar flow of a cooling medium which is parallel to a heat transmission face), spray cooling of the inner circumferential surface is stopped, a tube for introducing a cooling medium is put in the bore of the bushing, and the cooling medium is allowed to flow in a longitudinal direction of the bushing in parallel with a heat transmission surface within the space between the outer circumferential surface of the cooling medium guide tube having a smaller outside diameter than the inside diameter of the track bushing and the inner circumferential surface of the bushing.

According to the third aspect of the invention, there is provided a method of producing a track bushing wherein in a series of quenching processes in which by use of a quenching system capable of cooling the inner circumferential surface and outer circumferential surface of a track bushing material and/or carrying out induction heating from the outer circumferential surface, after the track bushing material has been heated to a quenching temperature, preceding cooling of the inner circumferential surface of the track bushing material is effected, or alternatively, preceding cooling of the inner circumferential surface is effected while carrying out additional induction heating from the outer circumferential surface, and after an elapse of a specified time, cooling from the outer circumferential surface is carried out, or alternatively, the induction heating from the outer circumferential surface is stopped to cool the outer circumferential surface, at least the inner circumferential surface of the track bushing is cooled by a cooling medium flowing in parallel with the inner circumferential surface and axial direction of the track bushing, so that a quench-hardened case can be formed without irregularities in the inner circumferential surface of a long track bushing having a small inside diameter or in the inner circumferential surfaces of a plurality of track bushings while forming a quench-hardened case in the outer circumferential surface by the cooling from the outer circumferential surface, such that an unhardened quenched layer is left between the quench-hardened cases on inner and outer circumferential surface sides, such that the quench-hardened case on the outer circumferential surface side is deeper than the quench-hardened case on the inner circumferential surface side, and such that the unhardened quenched layer has a structure containing one or more selected from ferrite, pearlite and bainite which precipitate in the course of cooling from the quenching temperature.

In each aspect of the invention, it is preferable that at least either the inner circumferential surface or the outer circumferential surface be cooled by a cooling medium flowing in parallel with the axial direction of the track bushing. In addition, the induction heating or the additional induction heating is preferably carried out with a spiral coil and the plurality of track bushings are preferably quenched at the same time. The induction heating or the additional induction heating are carried out with a saddle-shaped heating inductor and the heating by the saddle-shaped heating inductor is preferably carried out with an insulator interposed between every adjacent track bushings.

Preferably, when simultaneously quenching the plurality of track bushings, every adjacent track bushings are overlapped with each other through an intermediate partition jig such that their end faces are exposed, whereby the surface layers of the flat sealing portions of both end faces of the track bushings in contact with the intermediate partition jig are quench-hardened to a depth no less than one-half the wall thickness of the track bushings from the outer circumferential surfaces.

Preferably, in order to introduce the cooling medium for cooling the inner circumferential surface, a guide tube having a smaller outside diameter than the inside diameter of the track bushing is disposed on the inner circumferential surface side and the cooling medium introduced by the guide tube is allowed to flow in parallel with the inner circumferential surface of the track bushing and in substantially parallel with the axial direction of the track bushing within the space defined by the outer circumferential surface of the guide tube and the inner circumferential surface of the track bushing, whereby laminar flow cooling is carried out. After introduced into the guide tube, the cooling medium for cooling the inner circumferential surface is preferably diverted by a wall face into the space defined by the outer circumferential surface of the guide tube and the inner circumferential surface of the track bushing.

With this arrangement, if the track bushing is loaded in a vertically oriented condition in the quenching system, the cooling medium flows upwardly from the bottom within the guide tube and after diverted by a diverting member which has a spherical surface or similar curved surface and is located at a position upper than the uppermost position of the track bushing, the cooling medium flows within the space defined by the outer circumferential surface of the guide tube and the inner circumferential surface of the track bushing. As a result, the cooling medium for the inner circumferential surface can be effectively discharged.

Apart from the above laminar flow method, there are other methods. One method is such that a cooling medium sprayed from an inside nozzle is applied to the inner circumferential surface of the track bushing to fill the space defined by the inside nozzle and the inner circumferential surface of the track bushing, while closing the upper end of the track bushing, whereby a laminar flow directed downward in a longitudinal direction of the track bushing is caused. Another alternative is such that the lower end of the track bushing is closed thereby to cause a laminar flow directed upward in a longitudinal direction of the track bushing. Although it is apparent that the laminar flow directed upward in the longitudinal direction does not require a large amount of the cooling medium, it is necessary for quench-hardening to ensure satisfactory cooling power and the amount of the cooling medium should be large enough to obtain satisfactory cooling power. In addition, a device for discharging the cooling medium is required. For these reasons, a laminar flow directed upward in the longitudinal direction is preferable in view of equipment.

Where the inner circumferential surface of a cylindrical body which has a small inside diameter and is composed of a plurality of track bushings or the like overlapped with each other is quench-hardened by the laminar flow cooling, the yield of the production of track bushings which do not require their end faces to be quench-hardened can be apparently increased and investment on quenching equipment can be significantly suppressed.

Preferably, the diverting member serves as a partition for dividing the flow of the cooling medium for the inner circumferential surface from the flow of the cooling medium for the outer circumferential surface. In view of the suppression of the entrapment and retention of gas due to shocks caused by the collision of the cooling medium flowing out of the cooling medium guide tube and the turbulence of the flows, the diverting section of the diverting member is preferably made in the form of a concave spherical surface or similar curved surface. Further, the curved surface is substantially parallel to the axial direction of the track bushing at the positions where the curved surface is in contact with the track bushing. Where the diverting member has such a configuration, the cooling medium can be satisfactorily formed into a laminar flow at the above contact position and negative pressure is generated in the small space between the track bushing and the diverting member according to the Bernoulli's principle so that a leakage of the cooling medium toward the outer circumferential surface does not occur. As a result, the end faces of the track bushing can be evenly quenched. Note that the end faces are utilized as working faces in the case of pre-lubricated track bushings.

In addition, the surfaces of the flat sealing portions at both end faces of the track bushing can be stably quenched to form a quench-hardened case whose depth from the outer circumferential surface is no less than one-half the wall thickness of the track bushing, by use of the partition jigs which divide the cooling medium for the inner circumferential surface from the cooling medium for the outer circumferential surface and which can speed down the cooling of the inner circumferential surface in the neighborhood of both end faces of the track bushing when cooling the inner circumferential surface, and allows both end faces to be effectively heated by the additional induction heating from the outer circumferential surface.

Preferably, the width of the space defined by the outer circumferential surface of the guide tube and the inner circumferential surface of the track bushing (which corresponds to the difference between the outside diameter of the guide tube and the inside diameter of the track bushing) ranges from 1 mm to 20 mm. The lower limit of the width has been determined to be 1 mm taking account of the accuracy of positioning (the position of the inner circumferential surface of the bushing, the position of the guide tube, and the coaxial rotation of the track bushing during the additional induction heating are important factors for uniform heating), for fear that the cooling medium is excessively heated by the heat quantity generated when it is taken out of the track bushing during cooling. If the upper limit exceeds 20 mm, the necessary amount of water increases wastefully. Practically, the width which does not cause any problem in cooling is 3 to 10 mm.

Uniform quenching of the inner circumferential surface of the track bushing should be discussed in relation to the hardenability of steel used as a material of a track bushing. Where ordinary carbon steel is used, water is used as the cooling medium and the above described cooling with a laminar flow in the longitudinal direction of the track bushing is carried out, the quantity of water per unit sectional area for the sectional area obtained from the inside diameter of the track bushing and the outside diameter of the guide tube for the cooling medium is preferably 9 liters/min·cm² or more and the speed of the flow is preferably 1.5 m/sec or more. For attaining cooling power sufficient for forming a uniform quench-hardened case, it is preferable to set the quantity of water per unit area for the areas of the inner circumferential surface and outer circumferential surface of the track bushing to 0.1 liter/min·cm² or more. For example, where a steel material to which various alloy elements such as Cr, Mo, Mn and Ni have been added to obtain improved hardenability is used, quenching with small amounts of the cooling medium for the purpose of cost saving is possible, but it is more preferable to use inexpensive water as the cooling medium, thereby leading to a reduction in the cost of the steel material.

If the guide tube for the cooling medium is excessively close to the inner circumferential surface of the track bushing because of the additional induction heating from the outer circumferential surface which is effected prior to a start of the inner circumferential surface cooling or during the cooling, the guide tube itself is subjected to the induction heating, wasting energy or the guide tube is heated and cooled so that there arises the risk of deformation and deterioration in the guide tube. It is therefore preferable to coat or cover the outer circumferential surface of the guide tube for the cooling medium with a material having a heat insulating function or radiation heat reflecting function. With this arrangement, productivity can be improved by reducing the heating time.

In cases where the guide tube for the cooling medium itself is subjected to induction heating as mentioned earlier, the depth of heat penetration can be reduced by increasing the frequency and it is therefore desirable to employ such a heat restraining technique by selection of an adequate high frequency.

As the material of the guide tube, there are suitably used ceramics materials such as $Si_3N_4$, $Al_2O_3$ and $SiO_2$ which hardly generate heat in induction heating, antiferromagnetic alloys such as Fe-30 to 50 at % Mn alloys, and metal alloys such as nichrome and kanthal which have extremely great electric resistance. The same materials are also suitably used for the cooling medium partition jigs positioned in contact with the upper and lower end faces of the track bushing and for the intermediate partition jig held between the track bushings.

Although a spray quenching system is usually suitably used for cooling the outer circumferential surface of the track bushing, there is a problem in the positional relationship between the spray quenching system and a heating inductor (or coil) for use in induction heating from the outer circumferential surface. More specifically, the closer to the outer circumferential surface of the track bushing the heating inductor is positioned, the more effectively the heating inductor can heat the track bushing. However, when starting spray cooling of the outer circumferential surface after completion of heating, the heating inductor becomes an obstacle to the spray cooling, causing a risk of non-uniform heating. Where quenching is applied to a long cylindrical body such as, for instance, two track bushings with their end faces overlapping with each other, the amount of spray water dropping onto the upper end increases inevitably, which hinders the spray cooling at the lower end or causes the retention of the cooling water due to its excessive amount, with the result that non-uniform heating occurs at the lower end. To solve this problem, an attempt has been made as disclosed in Japanese Patent Publication (Kokai) Gazette No. 11-236619 according to which by shifting the track bushing, the heating coil or the outer circumferential surface cooling jacket while carrying out inner circumferential surface cooling, outer circumferential surface cooling can be effected with the heating coil being prevented from entering the outer circumferential surface cooling jacket. This method, however, disadvantageously involves more complicated quenching equipment.

It is conceivable that the above problem may be solved by employing a high frequency coil of spiral shape and utilizing a spray coming from the outer circumferential surface cooling jacket through the clearances of the coil for cooling the outer circumferential surface of the track bushing. This technique however presents the problems that a reflected flow is caused by the spray which has hit the coil and that non-uniform cooling is likely to occur if the clearance between the outer circumferential surface of the track bushing and the bore of the high frequency coil is too small.

To solve this, a fourth aspect of the invention resides in that in an apparatus for quenching the inner circumferential surface of a track bushing which has been substantially uniformly heated to a quenching temperature, a track bushing is inserted into an outer-circumference cylindrical tube having an inside diameter larger than the outside diameter of the track bushing; the outer circumferential surface is subjected to additional induction heating from the outside of the outer-circumference cylindrical tube while cooling the inner circumferential surface of the bushing; and after completion of the induction heating, a cooling medium is allowed to flow in the space between the outer-circumference cylindrical tube and the outer circumferential surface of the track bushing to cool the outer circumferential surface by a laminar flow cooling technique. This is the simplest method but involves simplified quenching equipment because there is no need to shift any of the bushing, the coil for additional heating and the outer circumferential surface jacket while carrying out inner circumferential surface cooling, in order to effect outer circumferential surface cooling in a condition in which the coil for additional heating does not enter the outer circumferential cooling jacket as described earlier.

To sum it up, according to a fourth aspect of the invention, there is provided a method of producing a track bushing, wherein, in the method having the third aspect, the cooling of the outer circumferential surface is carried out by the laminar flow cooling in such a way that the track bushing is inserted into an outer-circumference cylindrical body having an inside diameter larger than the outside diameter of the track bushing and the cooling medium is allowed to flow in parallel with the outer circumferential surface of the track bushing in the axial direction of the track bushing between the outer-circumference cylindrical body and the outer circumferential surface of the track bushing. Herein, part of the outer-circumference cylindrical body may include a saddle-shaped heating inductor or a spiral coil. Alternatively, the outer-circumference cylindrical body may be disposed inside or outside a saddle-shaped heating inductor or a spiral coil. The outer-circumference cylindrical body may be made from an insulating material so as to be hardly subjected to induction heating. From the view point of the fact that the outer-circumference cylindrical body should not be subjected to induction heating, the following mechanisms are suitably employed. Specifically, the outer-circumference cylindrical body is not located in the neighborhood of the coil during the induction heating and there is provided a mechanism for immediately shifting the outer-circumference cylindrical body to the position where it functions during the outer circumferential surface cooling. Alternatively, the outer-circumference cylindrical body is constituted by two or more parts and there is provided a mechanism for assembling the outer-circumference cylindrical body from these parts during the outer circumferential surface cooling. The outer-circumference cylindrical body is preferably made from an inexpensive metal having good durability.

The laminar flow cooling of the inner circumferential surface and the outer circumferential surface is carried out under a cooling condition which satisfies at least one of the following requirements: (i) the amount of the cooling medium is 9 liters/min·cm$^2$ or more for the sectional area obtained from the inside diameter of the track bushing and the outside diameter of the guide tube for the cooling medium; and (ii) the flow speed of the cooling medium is 1.5 m/sec or more; and/or (iii) the amount of the cooling medium is 0.1 liter/min·cm$^2$ for the respective areas of the inner circumferential surface and outer circumferential surface of the track bushing. In addition, the track bushing preferably rotates about its central axis during the induction heating in order to promote uniform heating. The track bushing may stop its rotation during the laminar cooling of the outer circumferential surface after suspension of the additional heating. In each of the foregoing aspects, the cooling medium for use in the cooling may be water or an aqueous quenching liquid. The cooling from the outer circumferential surface may be jet flow cooling using a spray or the like for uniformly cooling the outer circumferential surface. It is preferable to apply low temperature tempering at 100° C. to 350° C. after the quenching treatment.

A first track bushing according to the invention, which is produced by the track bushing production method having the first aspect, is designed such that by a series of quenching processes in which after the material of a track bushing has been entirely heated to a quenching temperature, preceding cooling from the inner circumferential surface of the track bushing material is carried out, or preceding cooling from the inner circumferential surface is effected while carrying out induction heating from the outer circumferential surface of the track bushing material and after an elapse of a specified time, cooling from the outer circumferential surface is carried out, quench-hardened cases extending from the outer and inner circumferential surfaces, respectively, to the wall center of the track bushing are formed, with an unhardened quenched layer left between the quench-hardened cases on an inner circumferential surface side and an outer circumferential surface side, such that the quench-hardened case on the outer circumferential surface side is deeper than the quench-hardened case on the inner circumferential surface side, such that the unhardened quenched layer has a structure containing one or more selected from ferrite, pearlite and bainite which precipitate in the course of cooling from the quenching temperature and such that the surface layers of flat sealing portions at both end faces of the track bushing are respectively quench-hardened to a depth no less than one-half the wall thickness of the track bushing from the outer circumferential surface.

Preferably, in the track bushing of the invention, the surfaces of the flat sealing portions at both end faces are substantially entirely quench-hardened, with the unhardened quenched layer formed so as to extend from the wall center toward the inner circumferential surface side, the unhardened quenched layer being linked to the inner circumferential surface in the neighborhood of both end faces except the flat sealing portions at both end faces. The quench-hardened cases are treated by low-temperature tempering so that the hardness of at least the quench-hardened cases in the outer circumferential surface and in the flat sealing portions is equal to or more than Hv=500.

A second track bushing according to the invention, which is produced by the track bushing production method having the second aspect, is designed such that, by a series of quenching processes in which after the material of a track bushing has been entirely heated to a quenching temperature, preceding cooling from the inner circumferential surface of the track bushing material is effected while carrying out induction heating from the outer circumferential surface of the track bushing material and after an elapse of a specified time, cooling from the outer circumferential surface is carried out, the series of quenching processes further including a step in which during the induction heating from the outer circumferential surface or during the time from when the induction heating is stopped until when the cooling from the outer circumferential surface is finished, the cooling from the inner circumferential surface is stopped to temper the inner circumferential surface within a short time by heat diffusion from the outer circumferential surface to the inner circumferential surface, quench-hardened cases extending from the outer and inner circumferential surfaces, respectively, to the wall center of the track bushing are formed, with an unhardened quenched layer left between the quench-hardened cases on an inner circumferential surface side and an outer circumferential surface side, such that the quench-hardened case on the outer circumferential surface side is deeper than the quench-hardened case on the inner circumferential surface side, such that the unhardened quenched layer has a structure containing one or more selected from ferrite, pearlite and bainite which precipitate in the course of cooling from the quenching temperature, and such that the quench-hardened case on the inner circumferential surface side has a tempered martensitic structure.

In the track bushing of the invention, the cooling from the inner circumferential surface is stopped during the induction heating from the outer circumferential surface or during the time from when the induction heating is stopped until when the cooling from the outer circumferential surface starts. After the cooling from the inner circumferential surface has been stopped and the inner circumferential surface has been tempered for a short time by heat diffusion from the outer circumferential surface to the inner circumferential surface, the inner circumferential surface may be cooled again.

Preferably, the surface layers of the flat sealing portions at both end faces are respectively quench-hardened to a depth no less than one-half the wall thickness of the track bushing from the outer circumferential surface.

Preferably, tempering treatment by induction heating is applied to the quench-hardened case on the outer circumferential surface side for a short time so that the hardness of at least the outer circumferential surface becomes Hv=500 or more.

A first track bushing producing apparatus which puts the above-described track bushing producing method into practice is a track bushing producing apparatus having a heater for entirely heating the material of a track bushing to a quenching temperature and/or a quenching system capable of induction heating the track bushing material from its outer circumferential surface, wherein the quenching system has an inner circumferential surface cooling system including a tubular or cylindrical body which has an outside diameter smaller than the inside diameter of the track bushing and which is disposed on the side of the inner circumferential surface of the track bushing, and the inner circumferential surface cooling system allows a cooling medium to flow within a space defined by the inner circumferential surface of the track bushing and the outer circumferential surface of the tubular or cylindrical body to cool the inner circumferential surface by a laminar flow.

The quenching system is preferably a guide tube comprised of a tubular or cylindrical body disposed on the side of the inner circumferential surface of the track bushing for introducing the cooling medium. A diverting member is disposed in the space defined by the outer circumferential surface of the guide tube and the inner circumferential surface of the track bushing, for diverting the cooling medium introduced by the guide tube, whereby the inner circumferential surface is cooled by a laminar flow.

In the invention, the inner circumferential surface is cooled by the laminar flow cooling, thereby enabling production of a plurality of track bushings in the following way. Specifically, by a series of quenching processes in which after a plurality of track bushings having a small inside diameter have been heated by a heater to a quenching temperature, the bushings are shifted into a quenching system such that their end faces overlap with each other, or after the track bushings have been induction heated at a time from their outer circumferential surfaces, using a induction heater equipped with a quenching system, preceding cooling of the inner circumferential surfaces is carried out, or preceding cooling of the inner circumferential surfaces is effected while carrying out induction heating from the outer circumferential surfaces, and then after an elapse of a specified time, the additional heating is stopped and the outer circumferential surfaces are cooled, the plurality of track bushings can be formed such that each track bushing has a structure having a U-shaped smooth hardness distribution wherein quench-hardened cases extending from the outer and inner circumferential surfaces, respectively, to the wall center of the track bushing are formed, with an unhardened quenched layer left between the quench-hardened cases on an inner circumferential surface side and an outer circumferential surface side, such that the quench-hardened case on the outer circumferential surface side is deeper than the quench-hardened case on the inner circumferential surface side, and such that the unhardened quenched layer has a structure containing one or more selected from ferrite, pearlite, bainite and martensite which precipitate in the course of cooling from the quenching temperature.

Herein, the inner circumferential surface cooling system preferably comprises a gas introducing valve for discharging the cooling medium outwardly from the track bushing while the inner circumferential surface cooling being suspended, the cooing medium flowing within the space defined by the guide tube and the inner circumferential surface of the track bushing. Since the guide tube for introducing the cooling medium will not be excessively heated by induction heating from the outer circumferential surfaces, no problem arises even if inexpensive austenitic stainless steel or copper-based material is used for the guide tube. However, the guide tube is preferably formed from ceramics materials such as $Si_3N_4$, $Al_2O_3$ and $SiO_2$ which hardly generate heat in induction heating in theory, or antiferromagnetic alloys such as Fe-30 to 50 at % Mn alloys.

There is provided a second track bushing producing apparatus comprising a heater for entirely heating the material of a track bushing to a quenching temperature and/or a quenching system capable of carrying out induction heating of the track bushing material from its outer circumferential surface, wherein the quenching system comprises an outer-circumference cylindrical tube for introducing a cooling medium, the outer-circumference cylindrical tube being disposed at the side of the outer circumferential surface of the track bushing and having an outside diameter larger than that of the track bushing, and wherein the cooling medium is allowed to flow between the outer-circumference cylindrical tube and the outer circumferential surface of the track bushing to cool the outer circumferential surface by a laminar flow.

Preferably, the outer-circumference cylindrical body for introducing the cooling medium is formed from $Si_3N_4$, $Al_2O_3$, $SiO_2$, mullite or the like which hardly generate heat in additional induction heating. Preferably, the outer-circumference cylindrical body is made from one of the aforesaid insulating materials, or partially includes a saddle-shaped heating inductor or spiral coil. Alternatively, the outer-circumference cylindrical body is disposed inside or outside a saddle-shaped heating inductor or spiral coil and made from one of the insulating materials so as to be hardly induction heated. From the view point of the fact that the outer-circumference cylindrical body should not be subjected to induction heating, the following mechanisms are suitably employed. Specifically, the outer-circumference cylindrical body is not located in the neighborhood of the coil during the induction heating and there is provided a mechanism for immediately shifting the outer-circumference cylindrical body to the position where it functions during the outer circumferential surface cooling. In the case where the outer-circumference cylindrical body partially includes a saddle-shaped heating inductor or is disposed outside a saddle-shaped heating inductor or spiral coil, the cylindrical body is desirably constituted by two or more parts which are away from the saddle-shaped heating inductor or spiral coil during the induction heating such that they are prevented from being induction heated as much as possible and are combined to form the outer-circumference cylindrical body during the cooling.

Preferably, the quenching system is designed such that an insulating material surrounding the track bushing is provided at at least the bore side or periphery side of a coil for additional induction heating, and/or such that the outer circumferential surface of a guide tube for introducing the cooling medium for the inner circumferential surface is coated with an insulating material. The quenching system preferably includes a detector for monitoring and controlling the temperature of the outer circumferential surface of the track bushing at a start of outer circumferential surface cooling.

In order to provide improved productivity, the present application provides a system composed of a supporting device for supporting the track bushing; a induction heater; a pressure device for pressurizing and fixing the track bushing; and a cooling system.

To sum it up, a third track bushing producing apparatus according to the invention comprises:

a supporting device for supporting a track bushing such that a specified quenching process can be effected after the material of the track bushing has been entirely induction heated to a quenching temperature from its outer circumferential surface, or such that a specified quenching process can be effected after setting the track bushing material which has been entirely heated to a quenching temperature in a different process;

a induction heater for carrying out induction heating of the track bushing supported by the supporting device, from its outer circumferential surface;

a pressure device for pressurizing and fixing the track bushing by pressing partition jigs against both end faces of the track bushing such that a cooling medium for the inner circumferential surface of the track bushing and a cooling medium for the outer circumferential surface of the track bushing do not interfere with each other; and a cooling system for independently carrying out inner circumferential surface cooling and outer circumferential surface cooling.

In the invention, the specified quenching operation may be a series of quenching processes in which preceding cooling from the inner circumferential surface of the track bushing is effected or induction heating from the outer circumferential surface of the track bushing is effected while carrying out preceding cooling from the inner circumferential surface and after an elapse of a specified time, cooling from the outer circumferential surface is carried out. Alternatively, the specified quenching operation may be a series of quenching processes in which cooling from the inner circumferential surface is once stopped to temper the inner circumferential surface within a short time by heat diffusion from the outer circumferential surface to the inner circumferential surface before starting cooling from the outer circumferential surface, and then, re-cooling of the inner circumferential surface and cooling from the outer circumferential surface are sequentially effected.

Preferably, the induction heater is a spiral coil for preventing an electric discharge phenomenon at the contact parts of adjacent track bushings or at the position of each partition jig disposed between adjacent track bushings, in cases where a plurality of track bushings are heated at the same time. Preferably, the supporting device is designed to be rotatable and vertically movable.

A fifth aspect of the present application resides in that in order to solve the problem of occurrence of quenching cracks which are likely to occur at the time of quenching if the outer circumferential surface of the track bushing is heated higher than the inner circumferential surface by excessively increasing the speed of heating with the intention of adjusting the heating time which is longer than the cooling time, there is provided another system for heating a plurality of track bushings to a quenching temperature by furnace or induction heating, and the track bushings are heated beforehand outside the quenching system and then shifted into the quenching system capable of induction heating from the outer circumferential surface, whereby the time taken for the induction heating in the quenching system is limited to the greatest possible extent and the deterioration of the partition jigs is restrained.

To sum it up, there is provided a fourth track bushing producing apparatus comprising:

a heater for substantially uniformly and entirely heating the material of a track bushing to a quenching temperature;

a quenching system capable of induction heating the track bushing material from its outer circumferential surface; and a conveyor for carrying the track bushing material into the quenching system after the track bushing material has been heated by the heater and carrying the track bushing out of the quenching system after a treatment has been applied to the track bushing material by the quenching system, wherein the quenching system is designed such that while preceding cooling from the inner circumferential surface of the track bushing material is carried out, heating from the outer circumferential surface is stopped after an elapse of a specified time to cool the outer circumferential surface.

According to the producing apparatus (system) of the present invention, a plurality of track bushings can be entirely heated by a heater, so that increased heating efficiency can be achieved, productivity can be dramatically improved compared to the overall heating carried out within the quenching system, and degradation of the quenching jigs and others can be prevented. For instance, where two track bushings each having an outside diameter of 59 mm, inside diameter of 38 mm and length of 138 mm are quenched at the same time, the conventional method carries out induction heating of the inner and outer circumferential surfaces in different processes so that one article is produced per about 30 seconds, whereas the system according to the invention produces one article per about 6 seconds. Thus, the invention has succeeded in quintuplicating the productivity of the conventional method.

BRIEF EXPLANATION OF THE DRAWINGS

FIGS. 14(*a*) and 14(*b*) are graphs each showing changes in temperature in the outer circumferential surface, the changes being caused by inner circumferential surface cooling.

BEST MODE FOR CARRYING OUT THE INVENTION

Referring now to the accompanying drawings, a track bushing and its producing method and apparatus will be hereinafter described according to embodiments of the invention.

(1) Nozzle for Inner Circumferential Surface Laminar Flow Cooling

Figure 1:
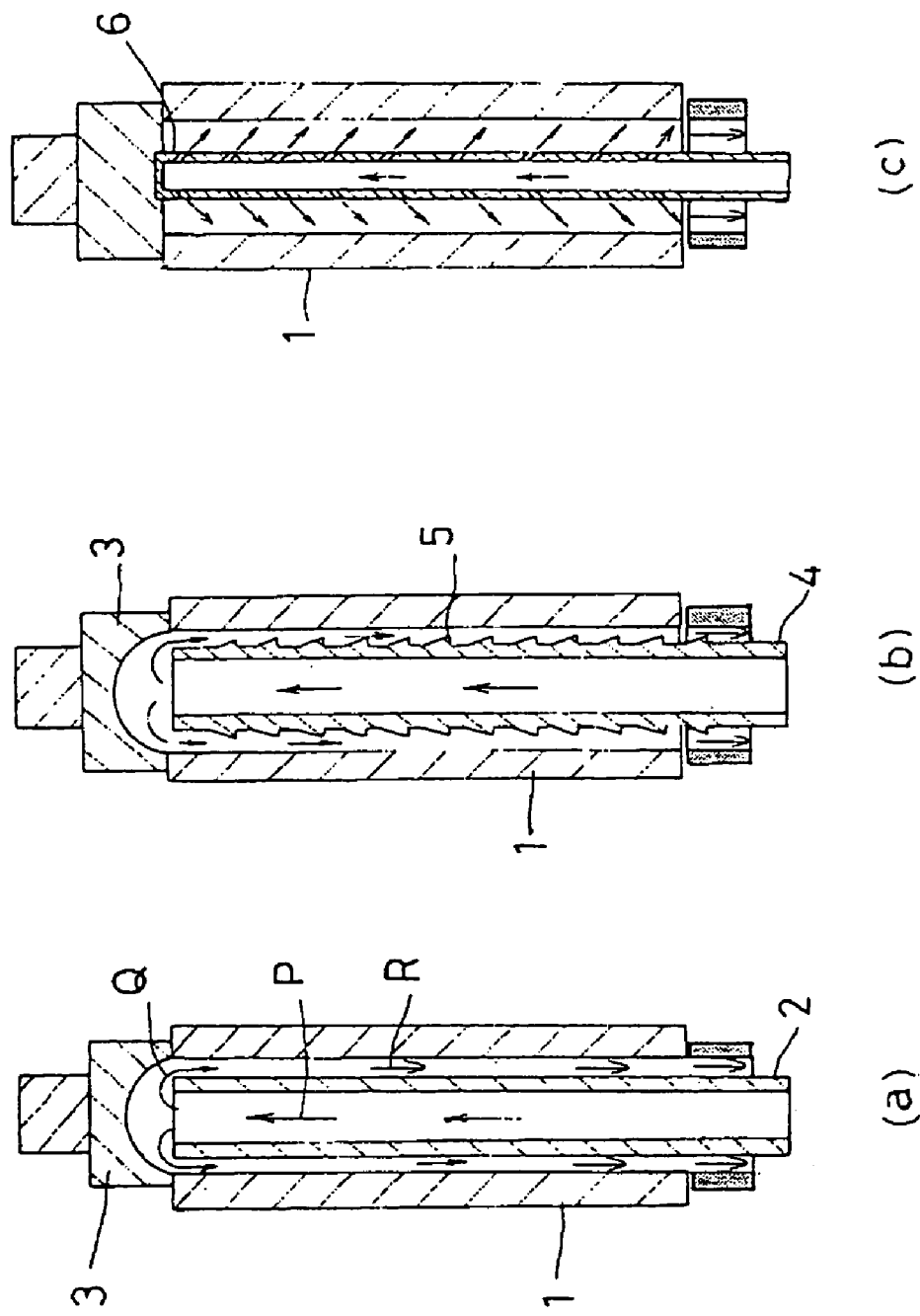
FIGS. 1(*a*), 1(*b*) and 1(*c*) are sectional views each exemplifying a nozzle for inner circumferential surface cooling.

FIGS. 1(*a*), 1(*b*) and 1(*c*) show examples of the nozzle for inner circumferential surface laminar flow cooling. In these examples, a track bushing is loaded in an upright condition in a quenching system.

In the example shown in FIG. 1(*a*), a guide tube 2 having an outside diameter smaller than the inside diameter of a track bushing 1 is disposed at the inner circumferential surface side of the track bushing 1 and a diverting member 3 is pressed against a flat sealing portion at the upper end face of the track bushing 1. The underside of the diverting member 3 is constituted by a spherical surface or similar curved surface. In this arrangement, a cooling medium flows upwardly from underneath (as indicated by arrow P) within the guide tube 2 and is diverted by the diverting member 3 (as indicated by arrow Q) at a position upper than the uppermost position of the track bushing 1. Thereafter, the cooling medium flows (as indicated by arrow R) within the space defined by the outer circumferential surface of the guide tube 2 and the inner circumferential surface of the track bushing 1.

In the example shown in FIG. 1(*b*), the outer circumferential surface of a guide tube 4 is treated so as to have irregularities 5, which promotes vapor film destruction at the time of quenching.

Except the above point, the example of FIG. 1(*b*) does not basically differ from the example of FIG. 1(*a*).

Apart from the laminar flow generation methods shown in FIGS. 1(*a*) and 1(*b*), there is a technique such as shown in FIG. 1(*c*) according to which a cooling medium discharged from an inside nozzle 6 is sprayed to the inner circumferential surface of the track bushing 1 to fill the space defined by the inside nozzle 6 and the inner circumferential surface of the track bushing 1 with the cooling medium, while the upper end of the track bushing 1 being closed so that a laminar flow directed in a longitudinally downward direction of the track bushing 1 is formed. In this technique, it is necessary to control the flow rate in relation to the inside diameter of the track bushing 1. This is apparent from the fact that the relationship substantially identical to the laminar flow generation by the above-described guide tube 2 holds. The laminar flow cooling by the inside nozzle 6 has such a feature that a constantly cold cooling medium can be evenly supplied to the upper, middle and lower parts of the inner circumferential surface of a track bushing. It is apparent that when simultaneously quenching the outer circumferential surfaces of a plurality of overlapped bushings using, for example, intermediate partition jigs, the above laminar flow cooling is suitably utilized for increasing hardenability in the gap between adjacent track bushings and forming a quench-hardened case in the flat sealing portions at both end faces of the track bushing. To ensure the dischargeability and uniform cooling capability of the laminar flow at the inner circumferential surface, it is preferable that the sprays are angled to face downward as shown in the drawing thereby forming a flow directed in a discharging direction. This technique is suitably applied to cooling of the inner circumferential surface of a longer cylindrical tube. However, the laminar flow generation method making use of jets from the inside nozzle 6 requires a number of nozzle holes in order to ensure a flow rate above a certain level and reveals disadvantageous properties such as poor controllability in stopping inner circumferential surface cooling in mid course. Therefore, this method should be employed in consideration of both of the cost and properties. When taking cost performance and suspension properties into account, the laminar flow generation method using the guide tube 2 is advantageous. For checking a laminar flow, it is preferable to put the spray nozzle in a transparent cylindrical tube and visually inspect the condition (pressure, flow rate) under which air bubbles caused by the sprays disappear.

Figure 2:
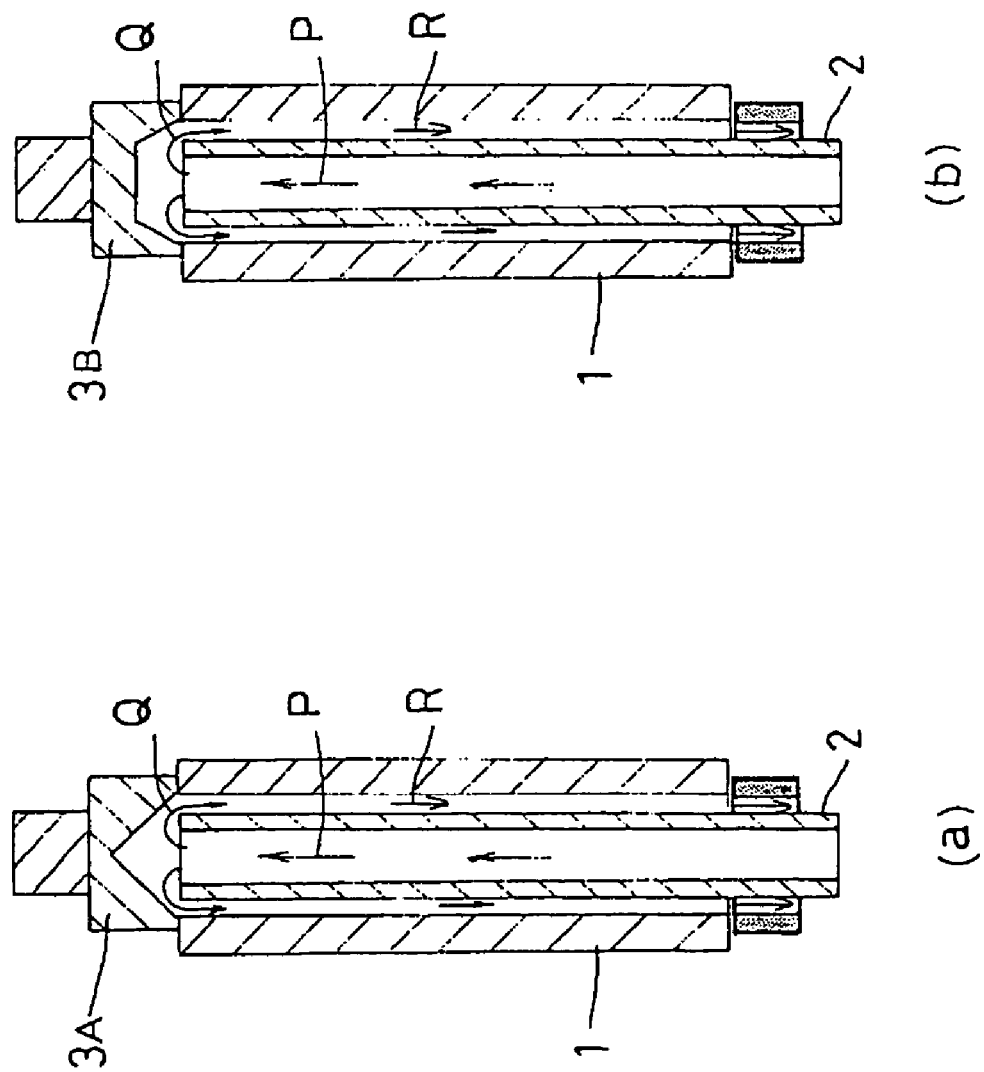
FIGS. 2(*a*) and 2(*b*) are sectional views each showing a diverting member according to a modification.

FIGS. 2(a) and 2(b) show diverting members according to modifications. It is apparent that the configuration of the underside of the diverting member is not limited to curved faces such as shown in FIGS. 1(a) and 1(b), and the same effect of the curved diverting member can be achieved by a diverting member 3A having a triangular profile at its underside as shown in FIG. 2(a) or a diverting member 3B having a trapezoidal profile at its underside as shown in FIG. 2(b).

(2) Partition Jig

Figure 3:
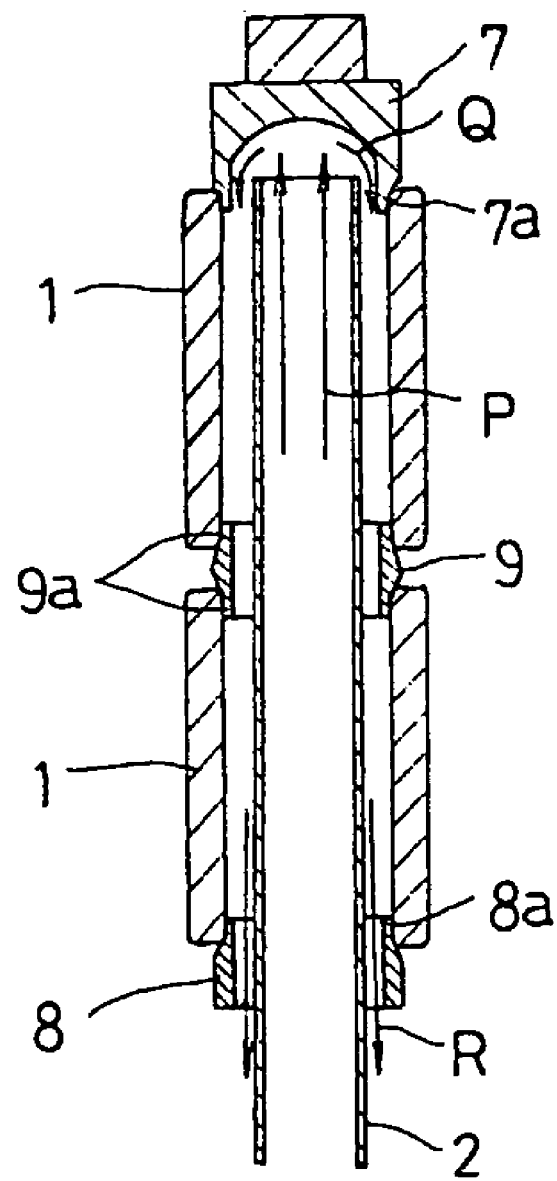
FIG. 3 is a sectional view showing a partition jig and its layout.

FIG. 3 shows the configuration and layout of a partition jig used when cooling the inner circumferential surfaces of two track bushings in an overlapped condition.

As shown in FIG. 3, the partition jig for dividing an inner circumferential surface cooling medium from an outer circumferential surface cooling medium comprises an upper partition jig 7, a lower partition jig 8, and an intermediate partition jig 9. The upper and lower partition jigs 7, 8 have, at their inner circumferential surfaces, thin cylindrical sections 7a, 8a, respectively, for preventing cooling of the inner circumferential surface and are pressed against flat sealing portions at both end faces of the track bushing 1 and against chamfered inner circumferential surface portions of the track bushing 1. Also, the intermediate partition jig 9 has, at its inner circumferential surface, thin cylindrical sections 9a, 9a for preventing cooling of the inner circumferential surface. The adjacent track bushings 1 are overlapped with each other through the intermediate partition jig 9 in such a manner that their end faces are exposed. With this arrangement, cooling of the inner circumferential surface in the vicinity of both end faces of each track bushing 1 is speeded down and both end face sections are effectively heated by additional induction heating from the outer circumferential surface so that the surface layer of the flat sealing portion of each end face can be quench-hardened to a depth no less than one-half the wall thickness of the track bushing 1 from the outer circumferential surface.

Figure 4:
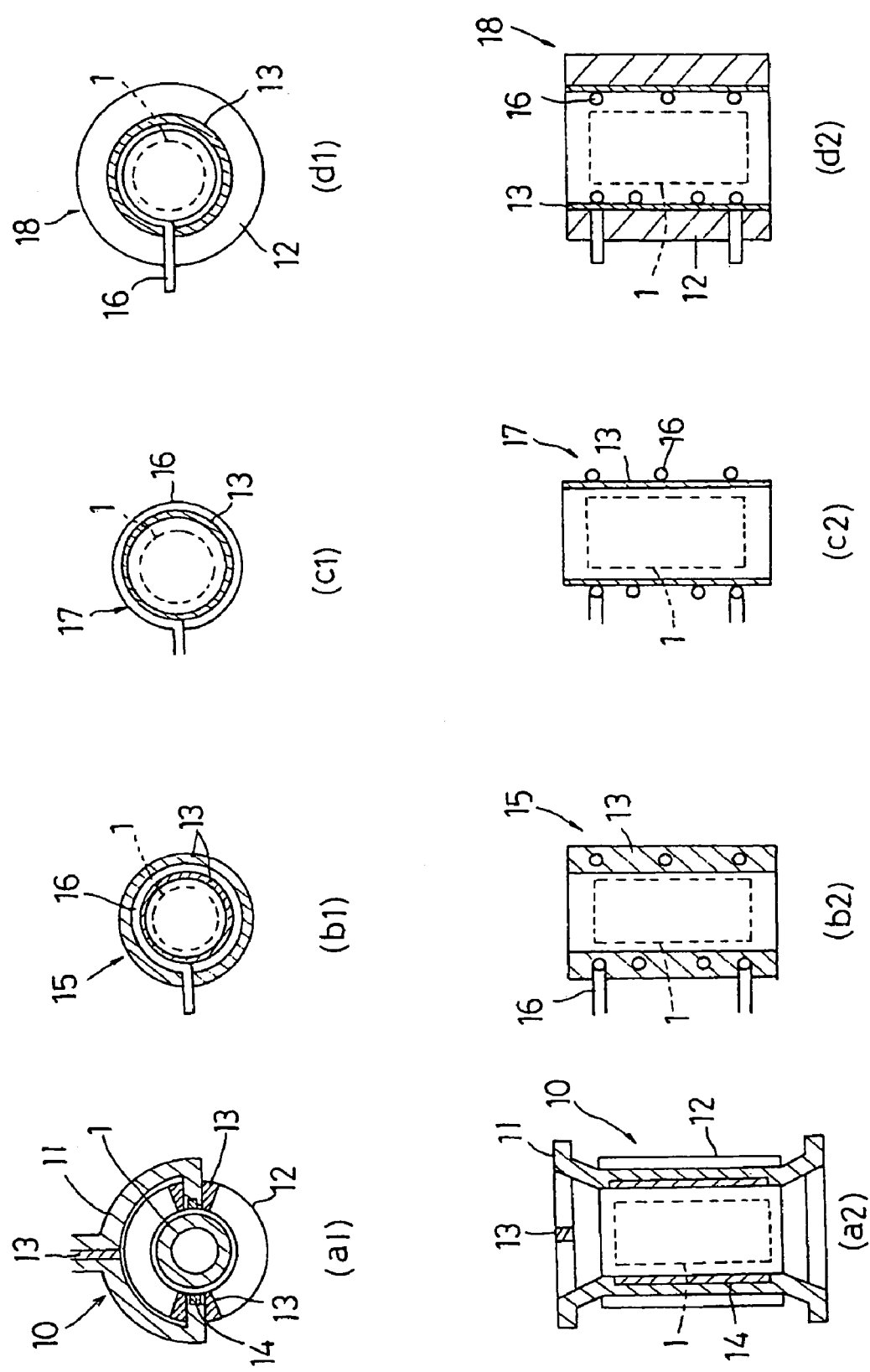
FIGS. 4(*a*1), 4(*a*2) to 4(*d*1), 4(*d*2) are sectional views each exemplifying an outer-circumference cylindrical tube.

(3) Outer-Circumference Cylindrical Body for Intratube Flow Cooling (Laminar Flow Cooling) of the Outer Circumferential Surface FIGS. 4(a1), 4(a2) to 4(d1), 4(d2) exemplify outer-circumference cylindrical bodies for intratube flow cooling of the outer circumferential surface.

In an outer-circumference cylindrical body 10 shown in FIGS. 4(a1) and 4(a2), a saddle-shaped heating inductor 11 and an outer circumferential surface cooling jacket 12 are integrally formed. Note that reference numeral 13 designates an insulating material and reference numeral 14 designates ferrite iron. In this example, the cooling medium forming a laminar flow is supplied from a number of nozzle holes defined in the outer circumferential surface cooling jacket 12.

The outer circumferential surface cooling jacket 12 is not necessarily integral with the saddle-shaped heating inductor 11 but may be divided into, for example, two parts. It is obviously possible to arrange these two halves so as to be located at positions where they are not induction heated by the saddle-shaped heating inductor during induction heating and to combine them to form the cylindrical tube when the induction heating is stopped to start outer circumferential surface cooling. In this case, an intricate device such as the insulating material 13 is apparently unnecessary.

FIGS. 4(b1) and 4(b2) show an outer-circumference cylindrical body 15 having a spiral coil 16 inserted therein. Reference numeral 13 designates an insulating material. FIGS. 4(c1) and 4(c2) show an outer circumference tube 17 in which a cylindrical body is inserted in the bore of the spiral coil 16 with the insulating material 13 between.

Further, FIGS. 4(d1) and 4(d2) show an outer-circumference cylindrical body 18 in which the outer circumferential surface cooling jacket 12 is disposed at the outer circumference section of the spiral coil 16 with the insulating material 13 between. In this example, the cooling medium forming a laminar flow is supplied from a number of nozzle holes defined in the outer circumferential surface cooling jacket 12, like the case shown in FIGS. 4(a1) and 4(a2).

Apparently, the outer circumferential surface cooling jacket 12 of FIGS. 4(d1) and 4(d2) effectively functions, when divided into parts like the above-described outer circumferential surface cooling jacket 12 composed of two halves. In this case, there is apparently no need to use an intricate device such as the insulating material 13.

Figure 5:
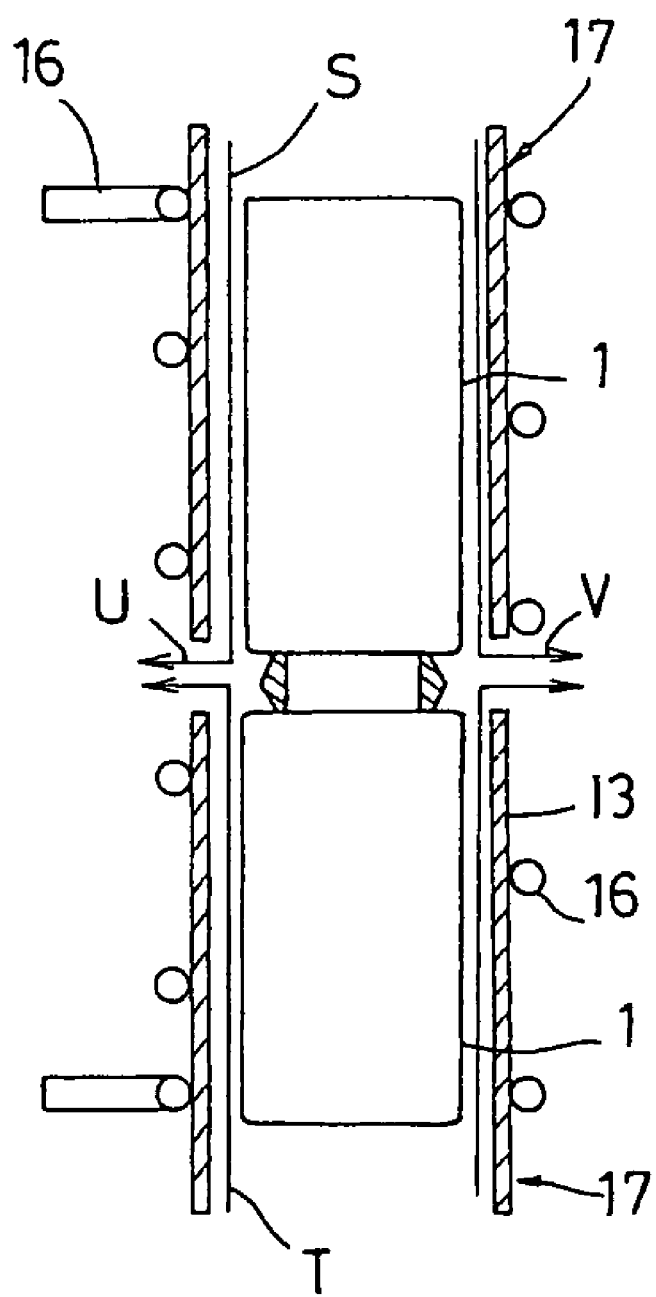
FIG. 5 is a sectional view exemplifying a flow of water in outer circumferential surface laminar flow cooling.

In these outer-circumference cylindrical bodies 10, 15, 17 and 18, it is preferable in view of the dischargeability of the laminar flow cooling medium for cooling the outer circumferential surface that the cooling medium be introduced from either the upper end or lower end of the track bushing 1 and discharged from the opposite end. It is also possible that the cooling medium is introduced from both ends of the track bushing 1 as indicated by arrows S and T in FIG. 5 and discharged from the center of the track bushing 1 as indicated by arrows U and V. Another alternative is such that the cooling medium is introduced from the center and discharged from both ends, reversely to the above case.

(4) Quenching System

Figure 6:
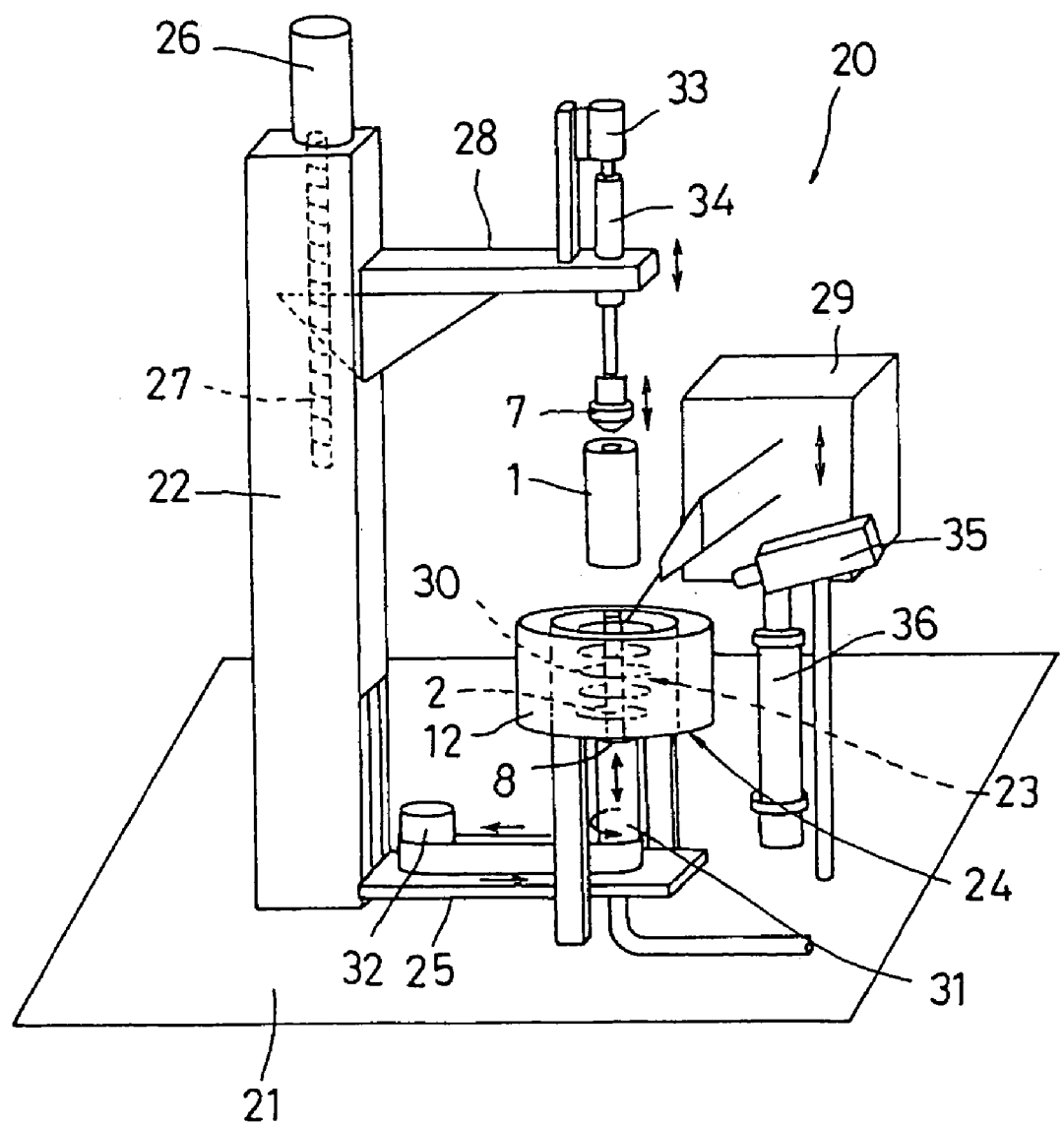
FIG. 6 is a schematic structural view of a quenching system.

FIG. 6 is a schematic structural diagram exemplifying a quenching system.

In a quenching system 20, a column support 22 stands upright on a base 21 on which a induction heater 23 and a cooling system 24 are supported. At the lower part of the column support 22, a first arm member 25 is supported by an elevating means (not shown) so as to be freely lifted and lowered. At the upper part of the column support 22, a second arm member 28 is supported by an elevating motor 26 and a ball screw 27 so as to be freely lifted and lowered. Herein, the induction heater 23 comprises a high frequency transformer 29 connected to a high frequency power source (not shown) and a spiral coil 30 disposed at the outer circumferential surface of the track busing 1, being connected to the high frequency transformer 29. The cooling system 24 comprises the guide tube (water guide tube) 2 for use in cooling the inner circumferential surface of the track bushing 1 and the outer circumferential surface cooling jacket 12 for cooling the outer circumferential surface of the track bushing 1, whereby the inner circumferential surface cooling and the outer circumferential cooling can be independently controlled.

Supported on the first arm member 25 is a substantially cylindrical support system 31 for supporting the track bushing 1 which is disposed coaxially with the guide tube 2 and rotatably about its axis. A gear motor 32 for forwardly, reversely rotating the support system 31 through a driven belt is also supported on the first arm member 25. The lower partition jig 8 is attached to the upper end of the support system 31. Supported on the second arm member 28 is a pressure device 34 which is vertically moved by an air cylinder 33 and the upper partition jig 7 is attached to the lower end of the pressure device 34. At a position adjacent the outer circumferential surface cooling jacket 12 on the base 21, a thermoviewer 35 for measuring the temperature of the outer circumferential surface of the track bushing 1 is disposed so as to be vertically movable by an air cylinder 36.

The quenching operation by use of the quenching system 20 of the above structure is carried out with a track bushing material which is set in the present system after being entirely heated to a quenching temperature in a different process, or which is subjected to induction heating by use of the induction heater 23 after being set in the present system. For setting the track bushing 1 in the quenching system 20, the support system 31 is lifted to a specified position by elevation of the first arm member 25 and after placing the track bushing 1 on the support system 31, the second arm member 28 is lowered to a specified level by driving the elevating motor 26. Then, the pressure device 34 is lowered by operation of the air cylinder 33 with the upper partition jig 7 positioned at the lower end of the pressure device 34 being pressed against the upper end face of the track bushing 1.

Thereafter, the first arm member 25 and the second arm member 28 are synchronously lowered, thereby inserting the guide tube 2 into the bore of the track bushing 1 and enclosing the outer circumferential surface of the track bushing 1 with the spiral coil 30 and the outer circumferential surface cooling jacket 12. Then, a series of quenching processes is carried out in such a way that while induction heating from the outer circumferential surface being carried out, cooling from the inner circumferential surface is effected and after an elapse of a specified time, the induction heating from the outer circumferential surface is stopped and cooling is done. During the additional heating of the outer circumferential surface, the support system 31 is rotated about its axis in order to promote uniform heating. During laminar flow cooling of the outer circumferential surface subsequent to suspension of the additional heating, the rotation of the support system 31 is stopped. At a start of outer circumferential surface cooling, the temperature of the outer circumferential surface of the track bushing 1 is measured by the thermoviewer 35 to ensure the quenching quality of the outer circumferential surface.

(5) Thermal Treatment System

Figure 7:
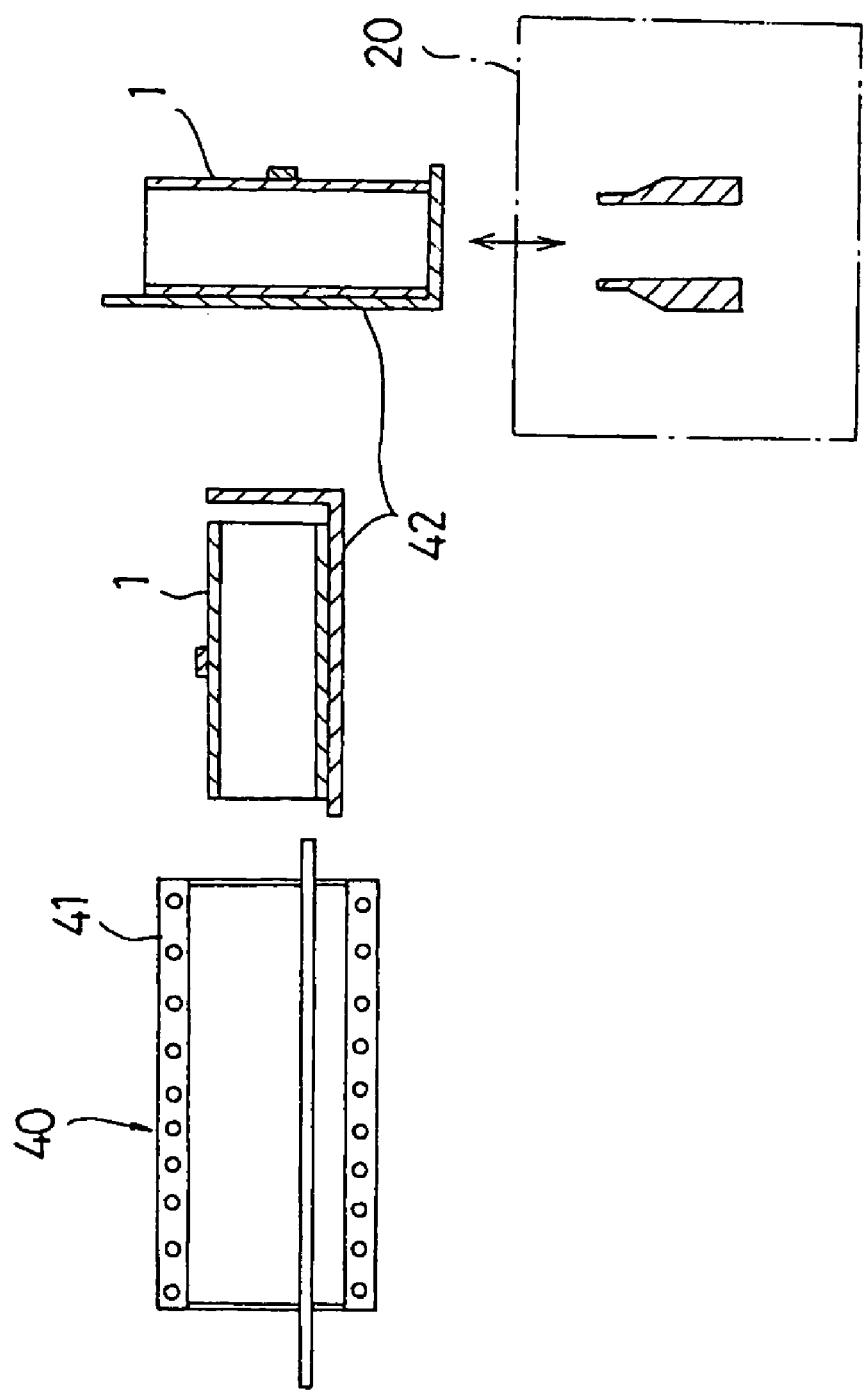
FIG. 7 is a schematic structural view exemplifying a thermal treatment system.

FIG. 7 is a schematic structural diagram exemplifying a thermal treatment system.

A thermal treatment system 40 comprises a tunnel type induction heating furnace (heater) 41 for substantially uniformly heating the entire track bushing 1 to a quenching temperature; and a conveyor system 42 for carrying the track bushing 1 which has been heated by the tunnel type induction heating furnace 41 into the quenching system 20 and carrying the track bushing 1 which has undergone the quenching treatment out of the quenching system 20.

Use of the thermal treatment system 40 enables overall heating of a plurality of track bushings 1 by use of the tunnel type induction heating furnace 41, so that improved heating productivity can be achieved. By stacking the plurality of track bushings 1 which have been simultaneously heated, using the intermediate partition jig(s) interposed between them and thermally treating them with the quenching system 20, dramatically improved productivity can be attained compared to the case where overall heating is carried out within a quenching system. In addition, it provides such an advantage that degradation of the quenching jigs and others can be prevented.

Next, concrete examples of the invention will be described.

(Preparation of Track Bushings)

Figure 8:
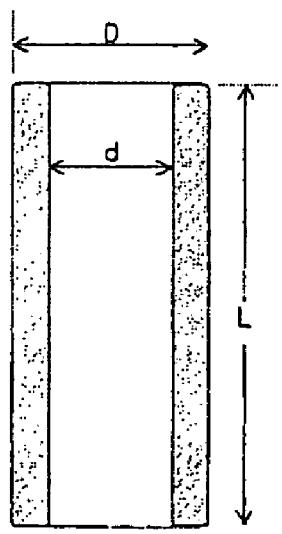
FIG. 8 shows a shape of the track bushings used in the embodiments.

FIG. 8 shows the dimensions of three types of track bushings used in the following examples. The edges of these track bushings at their inner circumference side are respectively cut off to form a chamfer having a width of 1 to 1.5 cm. The steel material used herein is carbon steel having a carbon concentration of about 0.5 wt %. The DI value of the bushings A, B is 0.85 inch and the DI value of the bushing C is 1.63 inches.

EXAMPLE 1

Heating Test 1

Figure 9:
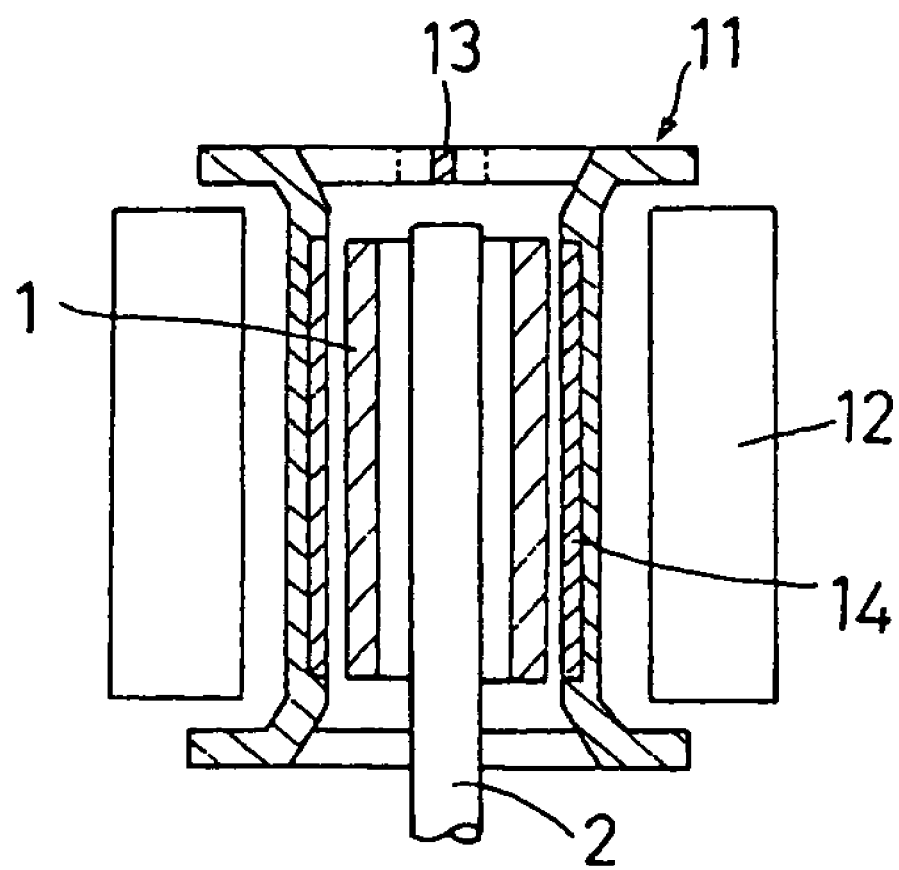
FIG. 9 is a sectional view showing a shape of a heating inductor for induction heating.

In this example, the saddle-shaped heating inductor 11 having ferrite iron 14 embedded in the inner circumferential surface thereof as shown in FIG. 9 was used as the heating inductor for induction heating. The outer circumferential surface cooling jacket 12 was disposed on the peripheral side of the saddle-shaped heating inductor 11 and the guide tube (water guide tube) 2 for cooling water was disposed in the bore of the heating inductor 11. The length of the embedded ferrite iron 14 was substantially equal to the length of the track bushing 1. The saddle-shaped heating inductor 11 was about 3 mm away from the outer circumferential surface of the track bushing 1. A high frequency heating power source of 6 kHz and 300 kW was used. In FIG. 9, reference numeral 13 designates an insulating material.

Figure 10:
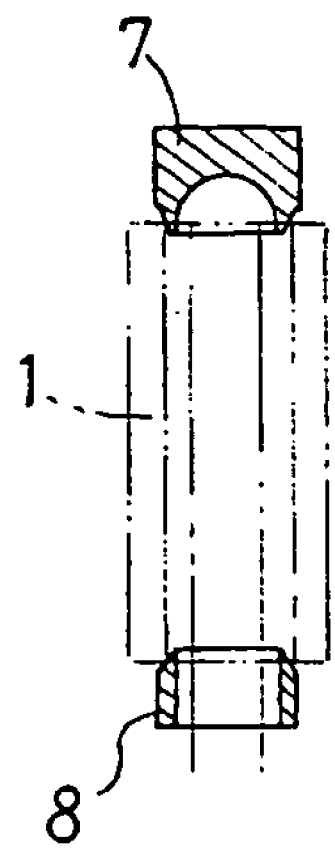
FIG. 10 is a sectional view showing a shape of partition jigs for cooling mediums.

As shown in FIG. 10, the track bushing 1 was fixed at its upper and lower ends by means of the upper partition jig 7 and lower partition jig 8 for dividing the cooling medium for the inner circumferential surface of the track bushing from the cooling medium for the outer circumferential surface of the same. In this condition, the track bushing 1 is rotated at a speed of 240 rpm while being entirely heated to about 950° C. The input power per bushing was as follows: the track bushing A=50 kW; the track bushing B=80 kW; and the track bushing C=150 kW. In this case, the heating time, for example, for the track bushing B was about 24 seconds.

Figure 11:
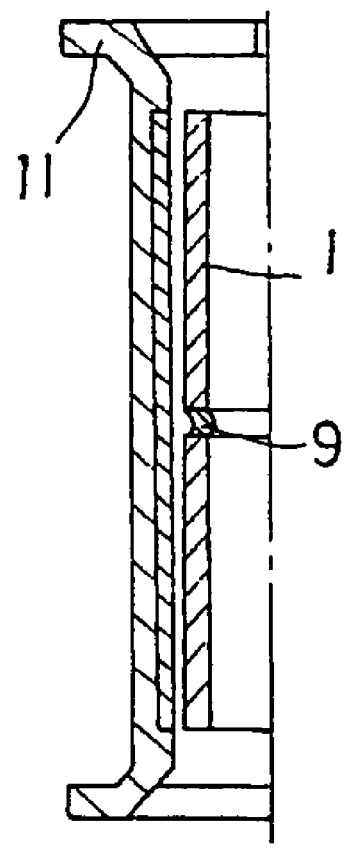
FIG. 11 is a sectional view showing a shape of an intermediate partition jig.

It had been found that if a metal body such as SUS304 was used for the partition jigs 7, 8 when carrying out induction heating from the outer circumferential surface while the track bushing being rotated, electric discharge occurred at the contact parts of the partition jig and the track bushing, abnormally heating the neighborhood of the contact parts and the end faces. Therefore, in this example, asbestos, which was an insulating material, was used as the material of the partition jigs 7, 8 thereby to prevent the above electric discharge phenomenon. In the heating test by use of the saddle-shaped heating inductor 11, it is desirable to use ceramics materials having good durability such as $Si_3N_4$, mullite, $Al_2O_3$ and quartz as the material of the partition jigs 7, 8.

Where induction heating from the outer circumferential surface was carried out with two track bushings B overlapped with each other, the same electric discharge phenomenon as described earlier occurred at the overlapped end faces of the track bushings, being accompanied with abnormal heating. In this case, the electric discharge phenomenon could be avoided by interposing the intermediate partition jig 9 made from asbestos excellent in insulation performance between the overlapped parts as shown in FIG. 11.

EXAMPLE 2

Heating Test 2

Figure 12:
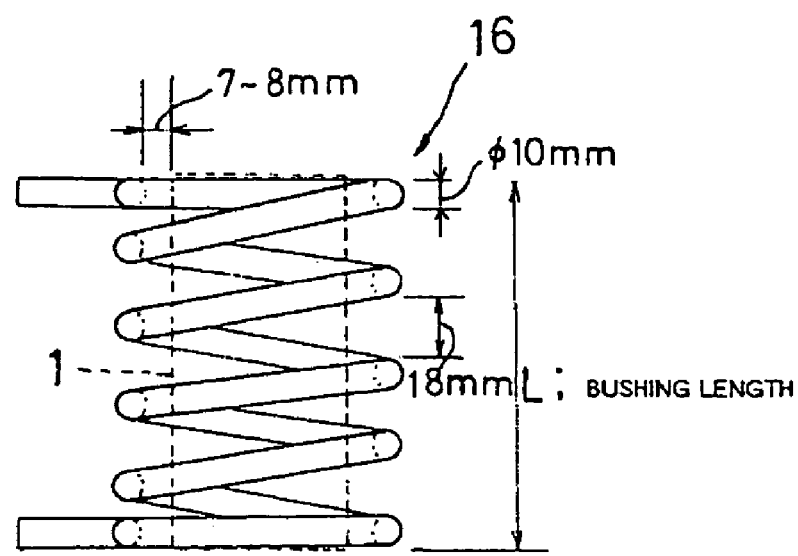
FIG. 12 shows a shape of a spiral coil.

In this example, induction heating was done, using the spiral coil 16 such as shown in FIG. 12 for the track bushing B in order to prevent the electric discharge phenomenon observed in Example 1. The basic design of the spiral coil 16 is as follows: A copper tube of $\phi 10$ mm was wound such that the coil spacing was 10 to 25 mm, the inside diameter of the coil was about 15 mm larger than the outside diameter of the track bushing, and a ½ turn at each coil end was parallel with the associated end face of the track bushing. The same high frequency power source as in Example 1 was used to heat the track bushing B with an input power of 110 kW per bushing. The time required for heating the track bushing B to about 950° C. was about 12 seconds.

Where heating was carried out using partition jigs (see FIG. 10) made from SUS304, it was found that the electric discharge phenomenon at the contact parts of the partition jigs was not observed and the abnormal heating due to this phenomenon could be prevented.

In addition, where two track bushings B overlapped with each other were heated, the electric discharge phenomenon at the overlapped parts of the track bushings could be prevented, and therefore it was found from this fact that this technique was very effective as a highly productive heating method for simultaneously heating a plurality of track bushings. Also, it was found to be very cost effective to form the partition jigs from highly durable metals.

Apparently, the main cause of the prevention of the electric discharge phenomenon which is observed in Example 1 is that the direction of the current allowed to flow in the track bushings by the saddle-shaped heating inductor is parallel with the axis of the cylindrical track bushing, whereas the direction of the current allowed to flow in the track bushings by the spiral coil is the same as the circumferential direction of the cylindrical track bushing.

EXAMPLE 3

Figure 13:
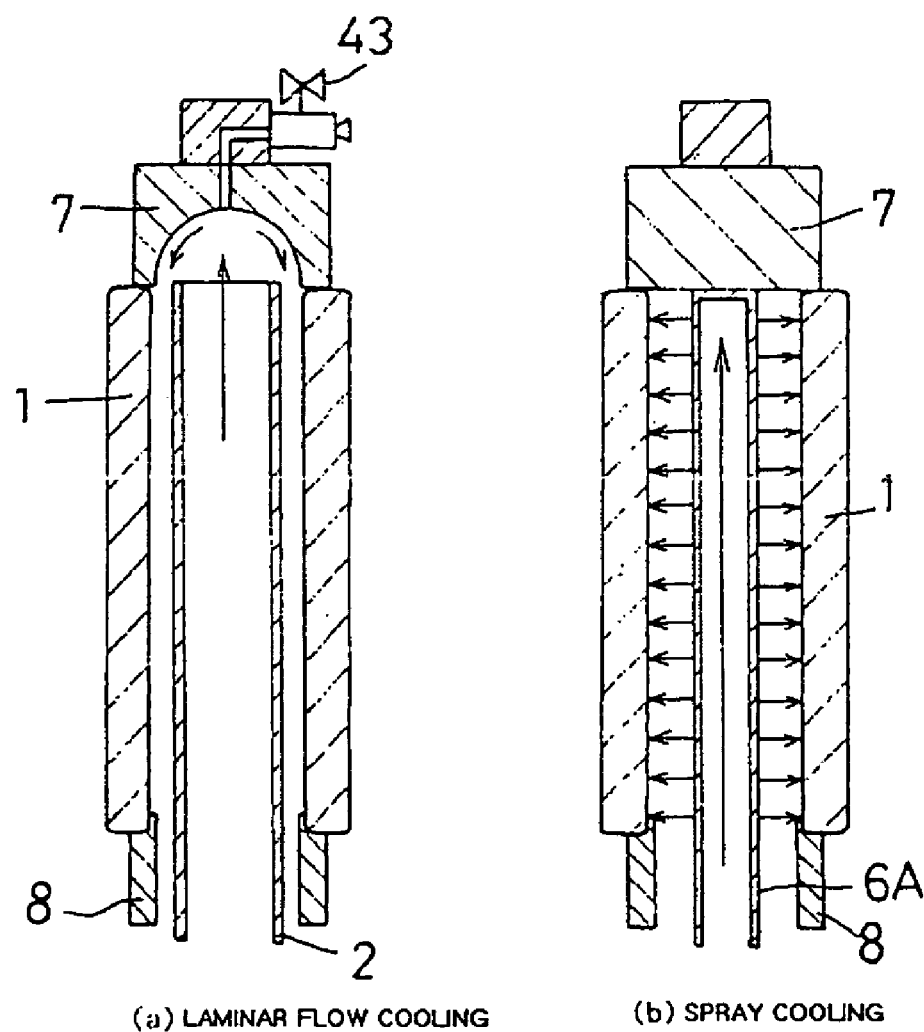
FIGS. 13(*a*) and 13(*b*) are sectional views each showing an inner circumferential surface cooling system.

Inner Circumferential Surface Cooling System and Observation of Cooling Condition In Example 3, a flowing test by visual inspection was made in the following way: Water was used as the cooling medium for inner circumferential surface cooling and a transparent, cylindrical acrylic resin tube having the same inside diameter as that of the track bushing was used in place of the track bushing. More concretely, the outside diameter of the guide tube 2 for cooling water was varied so as to be 2, 4, 8, 10 and 20 mm smaller than the inside diameter of the track bushing (acrylic resin cylindrical tube) 1 as shown in FIG. 13. By use of the upper partition jig 7 including a spherical surface having a slightly smaller diameter than the inside diameter of the track bushing 1, cooling water was flowed downwardly from above the cylindrical axis of the track bushing into the space defined by the inner circumferential surface of the track bushing 1 and the outer circumferential surface of the guide tube. The flow rates of water employed in the test were 25, 50, 100, 150, 200 and 300 liters/min.

As a comparative example, a spray nozzle 6A as shown in FIG. 13(b) was used. The nozzle for the track bushing B is designed such that the bore diameter of the nozzle is $\phi 1.3$ mm; the outside diameter of the nozzle is 15 mm which is smaller than the inside diameter of the track bushing (38 mm) by about 18 times the bore diameter of the nozzle; and nozzle holes are arranged in a zigzag pattern to cool the area of the inner circumferential surface of the track bushing having a diameter that is about 9 times the bore diameter of the nozzle.

As a result of the flowing test by visual inspection in which the above-described cylindrical acrylic resin tube was used, it was found that where the flow rate of water was 25 to 300 liters/min and the difference between the outside diameter of the cooling water guide tube and the inside diameter of the track bushing was 2 to 20 mm, good laminar flow condition free from air entrainment was established substantially instantaneously after a start of introduction of cooling water. More concretely, a check was made to study the amount of water necessary for generating a laminar flow with respect to the sectional area of the space that is determined by the inside diameter of the cylindrical acrylic resin tube and the outside diameter of the guide tube. It was found from the result that about 9 liters/min·cm$^2$ or more was necessary for the laminar flow nozzle shown in FIG. 13(a) whereas about 12 liters/min·cm$^2$ or more was necessary for the spray nozzle shown in FIG. 13(b). In addition, it was found that after suspension of a supply of cooling water from the guide tube 2, the laminar flow of water was about to be discharged by its own inertia force but drawn back by a reaction force which had been generated by vacuum condition caused within the sealed space so that it was non-uniformly slowly discharged after penetration of air through the outlet. This phenomenon obviously leads to such a situation that if the laminar flow cooling is interrupted in the course of inner circumferential surface cooling, the non-uniform slow discharge of the cooling water makes the cooling of the inner circumferential surface of the track bushing non-uniform. This indicates that there are difficulties in tempering by self-heating (i.e., self-tempering) such as re-cooling which is carried out after suspension of inner circumferential surface cooling in the course of quenching.

In the present invention, with the intention of quickly discharging the laminar flow of water by the aforesaid inertia force, there was provided a gas introducing valve 43 for preventing development of vacuum condition within the sealed space, and gas such as air was introduced through the gas introducing valve 43 about 0.1 second after suspension of cooling. As a result, excellent dischargeability could be confirmed.

The amount of water and the flowing condition of water at the inner circumferential surface were observed, using the spray nozzle 6A for the track bushings B and C (the outside diameter of the nozzle for the track bushing C=φ25 mm). As a result, it was found that good spraying condition was achieved in the upper part of the track bushing C where the flow rate of water was 100, 150 and 200 liters/min, but satisfactory spraying condition could not be obtained in the middle and lower parts of the track bushing C because of the interference between the water dropped from the upper part and the sprayed water. With a flow rate of 300 liters/min, the space defined by the inner circumferential surface of the track bushing and the outer circumferential surface of the spray nozzle was substantially completely filled with water, from the spray-cooled condition so that a substantially perfect laminar flow condition could be established. The same result was obtained when the track bushing B was tested with a flow rate of 150 liters/min. It was understood from this that the spray cooling under these conditions was substantially equivalent to the laminar flow cooling. Where the spray nozzle 6A was used, water flowed from the nozzle bore for a while after stopping the cooling water so that the cooling water dischargeability obtained by the guide tube 2 such as described earlier could not be expected.

EXAMPLE 4

Examination of Cooling Methods by Observation of Changes in the Temperature of the Outer Circumferential Surface in Inner Circumferential Surface Cooling The track bushing C was heated to about 980° C. under the same condition as in Example 2 and then, allowed to cool for 10 seconds. Only the above-described laminar flow cooling and spray cooling were done with flow rates of 100 and 200 liters/min without carrying out additional heating with high frequency. While changes in the temperature of the outside circumferential surface being measured by a non-contact type photo-thermometer, the speed and uniformity of the cooling were observed. As a result, it was found that, with this laminar flow cooing method, the upper, middle and lower parts of the track bushing were all substantially uniformly cooled as seen from FIG. 14(*a*). On the other hand, where the spray cooling method was adapted, the speed of cooling the upper part was found to be nearly the same as that of the laminar flow cooling, but, cooling of the middle and lower parts was slow as seen from FIG. 14(*b*). It can be understood from the result that the laminar cooling method is very effective as an inner circumferential surface cooling method. Note that where the flow rate was increased to 300 liters/min in the case of the spray cooling method, substantially uniform cooling could be achieved. This is because the inner circumferential surface was brought into a laminar flow cooled condition as indicated in Example 3.

The problem of the non-uniformity observed when the track bushings C and B were cooled by the spray cooling becomes more serious in the case of the track bushing A which has a smaller inside diameter and was cooled in a severer condition. It is apparently very difficult for the spray cooling to uniformly cool the inner circumferential surfaces of a plurality of track bushings at the same time with their end faces being overlapped with each other.

In this example, another test was conducted. Concretely, two track bushings B with their end faces being overlapped were subjected to only inner circumferential surface cooling under the same condition as in Example 2, and changes in the temperature of the outer circumferential surfaces were measured in the same way as described earlier. As a result, it was found that the outer circumferential surfaces of the two track bushings B were entirely and substantially evenly cooled and the laminar flow cooling method proved to be very effective as a method of cooling the inner circumferential surface of a small diameter cylindrical body.

Further, after the inner circumferential surface cooling of two track bushings B was carried out for 3 seconds, the inner circumferential surface cooling was suspended for 2 seconds to retrieve the temperature of the inner circumferential surface and then cooling was effected again. In this case, it was confirmed that changes in the temperature of the outer circumferential surfaces were uniform and the effect of improving the dischargeability of the cooling water was attained by operating the gas introducing valve 43 of Example 3.

EXAMPLE 5

Confirmation of the Heat Insulating Effect of Partition Jigs

Figure 15:
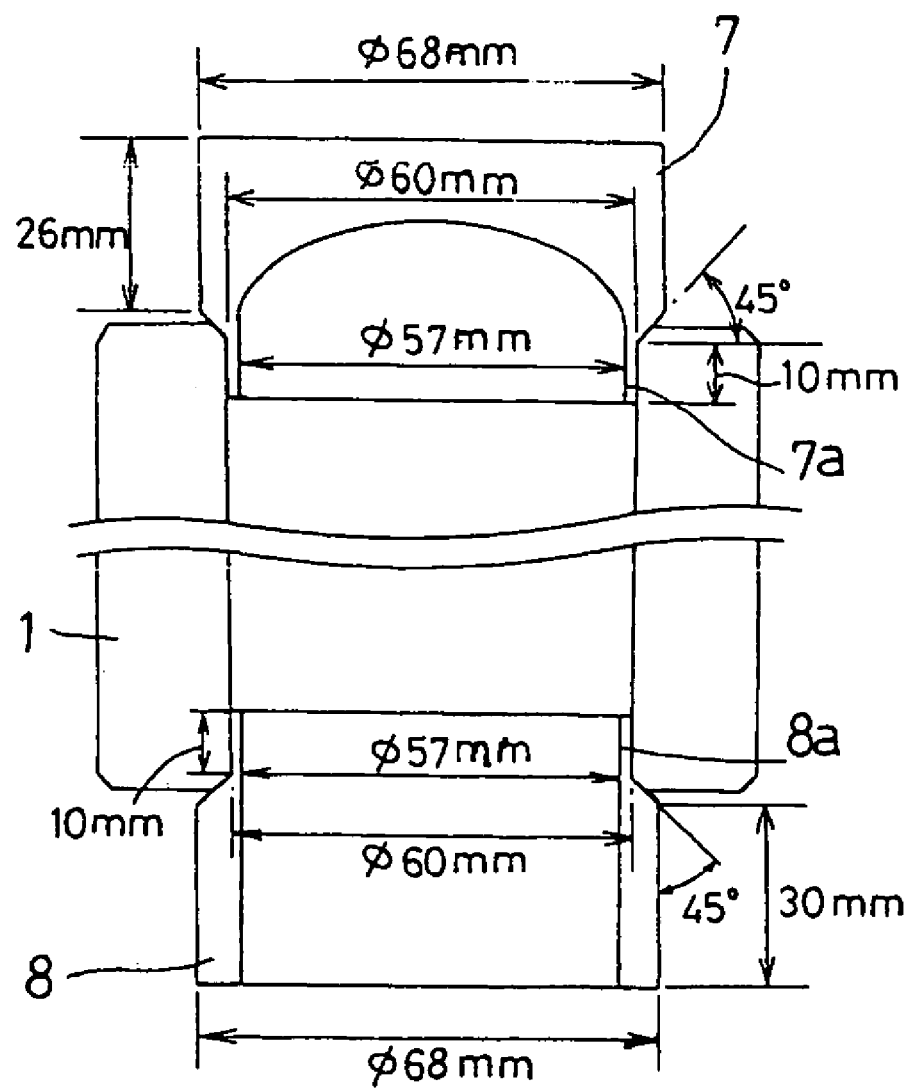
FIG. 15 shows a shape of a partition jig for a track bushing C.

FIG. 15 shows a partition jig used for the track bushing C in Example 5. As shown in FIG. 15, the upper partition jig 7 and the lower partition jig 8 have 10 mm-long, thin cylindrical sections 7*a*, 8*a* respectively, which are disposed close to the inner circumferential surface of the track bushing 1, for preventing inner circumferential surface cooling. These thin cylindrical sections 7*a*, 8*a* are designed to be fixed in contact with the chamfers of the track bushing 1 which have an angle of about 45 degrees. As the material of the partition jigs, SUS304 and asbestos were used.

After the track bushing C had been heated and cooled under the same condition as in Example 4, using the partition jigs 7, 8, inner circumferential surface cooling was effected with a flow rate of 200 liters/min and with a guide tube having an outside diameter 8 mm smaller than the inside diameter of the track bushing. Changes in temperature were checked at the outer circumferential surface. As a result, it was found that cooling of the outer circumferential surface was significantly delayed in the vicinity of the partition jigs 7, 8, so that the cooling prevention effect of the partition jigs was clearly confirmed. Where asbestos having a more distinctive heat insulating effect was used, the cooling prevention effect was found to be more remarkable.

The same cooling prevention effect was confirmed in the measurement of changes in temperature at the outer circumferential surfaces in the case where two track bushings B were overlapped with each other with the intermediate partition jig 9 (see FIG. 3) disposed between them and after heating was effected under the same condition as in Example 2, inner circumferential surface cooling was carried out with a flow rate of 200 liters/min and with a guide tube having an outside diameter 8 mm smaller than the inside diameter of the track bushing. In the example described later, the cooling prevention effect of the upper, lower and intermediate partition jigs was found to be extremely useful as means for quench-hardening the flat sealing portions at both end faces of one or a plurality of track bushings through outer circumferential surface cooling.

EXAMPLE 6

Quenching Test 1

In Example 6, a check was made in the following case: After heating by use of the saddle-shaped heating inductor of Example 1, the track bushing was allowed to cool for a specified time under the conditions shown in Table 1. Then, while carrying out additional induction heating from the outer circumferential surface under the condition similar to the heating condition, the laminar flow cooling with various flow rates and the spray cooling described in Example 3 were applied to the inner circumferential surface, using a guide tube having an outside diameter 8 mm smaller than the inside diameter of the track bushing. After completion of cooling, whether or not quenching irregularities had occurred was checked by measuring the hardnesses of the inner and outer circumferential surfaces.

TABLE 1

QUENCHING CONDITIONS

| TRACK BUSHING CODE | STANDING TO COOL/SOAKING TIME (sec) | ADDITIONAL HEATING AND PRECEDING INNER CIRCUMFERENTIAL SURFACE COOLING TIME (sec) |
|---|---|---|
| A | 1 | 2 |
| B | 2 | 5 |
| C | 10 | 20 |

Figure 16:
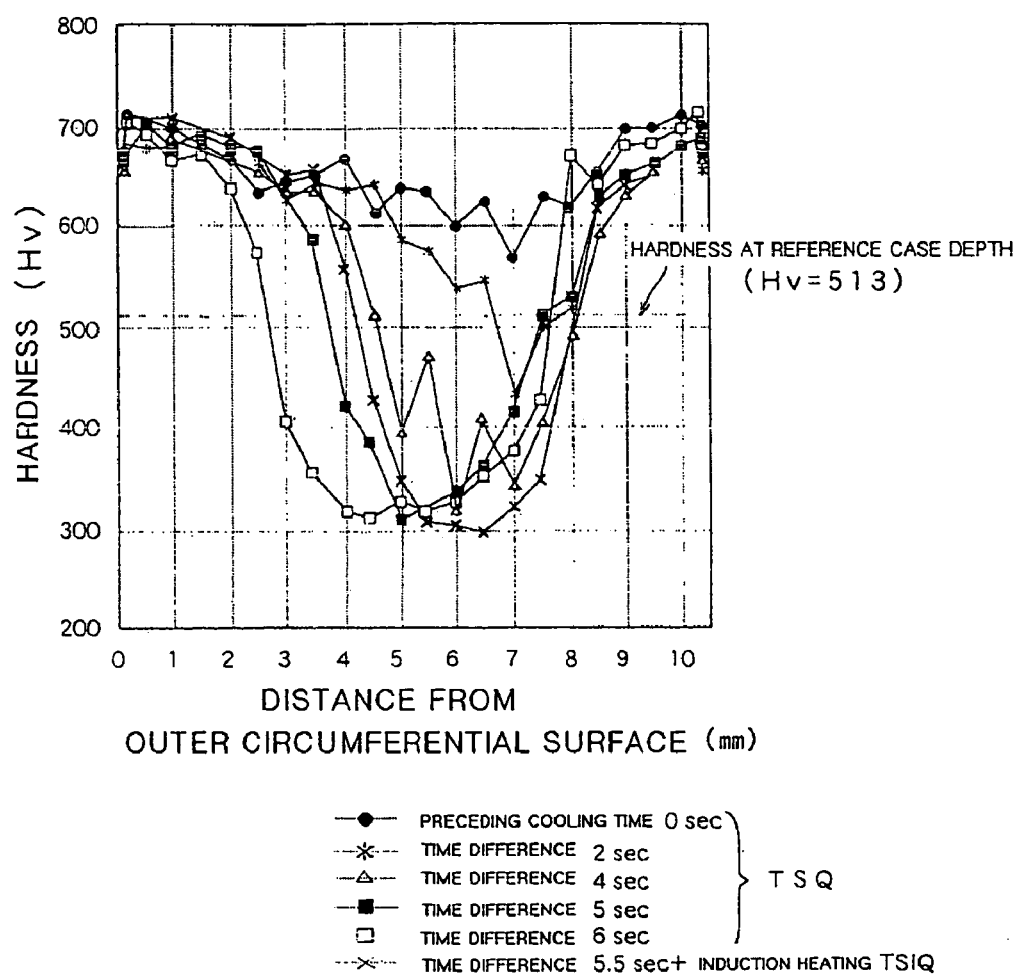
FIG. 16 is a graph showing the result of preliminary research for setting the time for the preceding inner circumferential surface cooling shown in Table 1.

The times required for the preceding inner circumferential surface cooling shown in Table 1 have been determined by preliminary research of the quench-hardness distributions at the sections of the walls of the track bushings A, B and C. For example, FIG. 16 shows hardness distributions obtained in the following cases (I) and (II): (I) The case (TSQ) where after heating the track bushing B to about 950° C. from the outer circumferential surface, preceding cooling is effected with various inner circumferential surface laminar flow cooling times and thereafter, the outer circumferential surface is cooled by the spray cooling. (II) The case (TSIQ) where induction heating from the outer circumferential surface is continued while carrying out preceding cooling for 5.5 seconds and then, the heating is stopped and the outer circumferential surface is cooled by the spray cooling. It can be understood from FIG. 16 that if the inner and outer circumferential surfaces are cooled at the same time in the case of TSQ, the wall of the track bushing is through-hardened, but, if a lead time of 4 to 6 seconds is provided, the hardness distribution in line with the object of the invention can be obtained. It is also found that in the case of TSIQ with a lead time of 5.5 seconds (marked with × in FIG. 16), the quench-hardened case at the outer circumferential surface is more deeply formed in line with the object of the invention and the inside unhardened quenched layer becomes more stable and softer.

The jacket for outer circumferential surface spray cooling used in Example 6 has nozzles having a bore diameter of 1.5 mm and arranged in a zigzag pattern at intervals of 13.5 mm. The clearance between the outer circumferential surface of the track bushing and the inner circumferential surface of the jacket is 30 mm for the track bushings A, B and C.

Table 2 shows the result of quenching of the inner and outer circumferential surfaces. When two overlapped track bushings A were quenched by the laminar flow quenching, quenching irregularities were not found at the inner circumferential surfaces so that excellent quench quality could be ensured. In contrast with this, quenching irregularities remained at the lower part of the inner circumferential surface in the case of the spray cooling even when one track bushing was quenched, because the inside diameter of the track bushing was smaller than the length of the track bushing. It has been found from an evaluation based on the length (L) to inside diameter (d) ratio (i.e., L/d) of the track bushings A, B and C that quenching irregularities are likely to remain when the L/d ratio is about 3.3 or more. The relationship between the L/d ratio and the probability of occurrence of quenching irregularities is very important in view of the dischargeability of the spray water at the upper part.

TABLE 2

QUENCHING RESULT 1 (HEATING BY SADDLE-SHAPED HEATING INDUCTOR)

| | TRACK BUSHING CODE | NUMBER OF BUSHINGS PROCESSED | FLOW RATE AT INNER CIRCUMFERENTIAL SURFACE (l/min) | FLOW RATE AT OUTER CIRCUMFERENTIAL SURFACE (l/min) | DISPLACEMENT OF HEATING INDUCTOR | QUENCHED CONDITION OF INNER CIRCUMFERENTIAL SURFACE | QUENCHED CONDITION OF OUTER CIRCUMFERENTIAL SURFACE | LOADING POSTURE FOR QUENCHING (L/d) |
|---|---|---|---|---|---|---|---|---|
| LAMINAR FLOW COOLING | A | 1 | 25 | 100 | NO | ○ | ○ | 3.37 |
| | | 2 | 25 | 100 | NO | ○ | X | 6.75 |
| | B | 1 | 25 | 200 | NO | ○ | ○ | 3.63 |
| | | 2 | 25 | 200 | NO | X | X | 7.26 |
| | | | 50 | 300 | NO | ○ | X | |
| | | | 100 | 300 | NO | ○ | X | |
| | C | 1 | 100 | 400 | NO | ○ | X | 3.48 |
| | | | 200 | 400 | NO | ○ | X | |
| | | | 100 | 300 | YES | ○ | ○ | |
| SPRAY COOLING | A | 1 | 50 | 100 | NO | Δ | X | 3.37 |
| | | 2 | 50 | 100 | NO | X | X | 6.75 |
| | B | 1 | 100 | 200 | NO | Δ | X | 3.63 |
| | | 2 | 100 | 200 | NO | X | X | 7.26 |
| | | 2 | 200* | 200 | NO | ○ | X | 7.26 |
| | C | 1 | 200 | 400 | NO | Δ | X | 3.48 |
| | | 1 | 300* | 400 | NO | ○ | X | |

Δ: QUENCHING IRREGULARITIES WERE NOT FOUND IN SOME CASES.
*SPRAY WATER TAKES THE FORM OF A LAMINAR FLOW.

Inner circumferential surface cooling was effected while sequentially directing the spray water jetted from the inside nozzle downward such that the spray water at the lower part has a downward angle of 30 degrees in maximum and as a result, the problem of quenching irregularities at the inner circumferential surface could be almost solved. However, when quenching two or more track bushings at the same time, occurrence of quenching irregularities could not be prevented.

Where two track bushings B and one track bushing C were quenched with the flow rate of the spray water at their inner circumferential surfaces being 200 liters/min and 300 liters/min respectively, it was found that quenching irregularities were prevented from occurring at the inner circumferential surfaces. Obviously, this is due to the fact that the spray water took the form of a laminar flow at the inner circumferential surfaces as described in Example 3.

Where two track bushings B were quenched under the condition that the difference between the inside diameter of the track bushings and the outside diameter of the guide tube was 8 mm and the flow rate of water was 25.50 liters/min, it was found that slight quenching irregularities started to occur at the lower parts of the inner circumferential surfaces apparent that a reduction in heating time is possible by increasing heat insulation efficiency. This also works on the nozzle arranged in the inner circumference section of the track bushing.

EXAMPLE 7

Quenching Test 2

In this example, two track bushings B were first heated using the spiral coil of Example 2 and then allowed to cool under the conditions shown in Table 1 for a specified time. Thereafter, the inner circumferential surfaces were cooled by the laminar flow cooling or spray cooling while carrying out additional induction heating from the outer circumferential surfaces for a specified time under substantially the same condition as the heating condition. After stopping the additional induction heating, the coil was removed within one second and subsequently, outer circumferential surface cooling was effected. After such a series of quenching processes, occurrence of quenching irregularities was checked by measurement of the hardnesses of the inner and outer circumferential surfaces. The result is shown in Table 3. Table 3 also shows the result of the spray cooling of the outer circumferences through the clearances of the coil.

TABLE 3

| | | | QUENCHING RESULT 2 (SPIRAL COIL) | | | | |
|---|---|---|---|---|---|---|---|
| | TRACK BUSHING CODE | NUMBER OF BUSHINGS PROCESSED | FLOW RATE AT INNER CIRCUM-FERENTIAL SURFACE (l/min) | FLOW RATE AT OUTER CIRCUM-FERENTIAL SURFACE (l/min) | DISPLACEMENT OF COIL | QUENCHED CONDITION OF INNER CIRCUM-FERENTIAL SURFACE | QUENCHED CONDITION OF OUTER CIRCUM-FERENTIAL SURFACE |
| LAMINAR FLOW | B | 2 | 100 | 200 | NO | ○ | Δ |
| COOLING | B | 2 | 100 | 200 | YES | ○ | ○ |
| SPRAY | B | 2 | 100 | 200 | YES | x | ○ |
| COOLING | B | 2 | 150* | 200 | YES | ○ | ○ |

Δ: QUENCHING IRREGULARITIES ARE PRESENT IN THE CASE OF $H_RC50 - H_RC55$.
*SPRAY WATER TAKES THE FORM OF A LAMINAR FLOW.

of the track bushings with a flow rate of 25 liters/min. Therefore, for evenly quenching the inner circumferential surfaces, it is desirable that the flow speed of water be 1 m/sec or more and the flow rate of water be 0.1 liters/min·cm² or more.

In this example, many of the quenching irregularities occurring at the outer circumferential surface are found at the lower part of the track bushing set in upright condition and this is apparently attributable to cooling irregularities due to the interference between the spray water for outer circumferential surface cooling and the saddle-shaped heating inductor. It is also apparent that, in the case of the track bushing C, occurrence of quenching irregularities at the outer circumferential surface can be prevented by effecting the outer circumferential surface spray cooling sequentially to removal of the saddle-shaped heating inductor within about three seconds after completion of additional induction heating.

Although the condition for the overall heating by high frequency in this example is the same as in Example 1, use of the outer circumferential surface cooling jacket can reduce the heat dissipation at the time of heating of the track bushing so that heating time can be also reduced by about 20% compared to the case of Example 1. Therefore, it is The quenching irregularities at the outer circumferential surfaces which were a problem of Example 6 could be completely removed when the coil was displaced. When outer circumferential surface cooling through the clearances of the coil was effected without displacing the coil, significant quenching irregularities which brought about a Rockwell hardness of $H_RC$ 50 or less were not observed, but the average quench hardness of the outer circumferential surfaces decreased by about $H_RC$ 2 to 3. Obviously, these is room for improvement in terms of the wear resistance of the track bushing.

Figure 17:
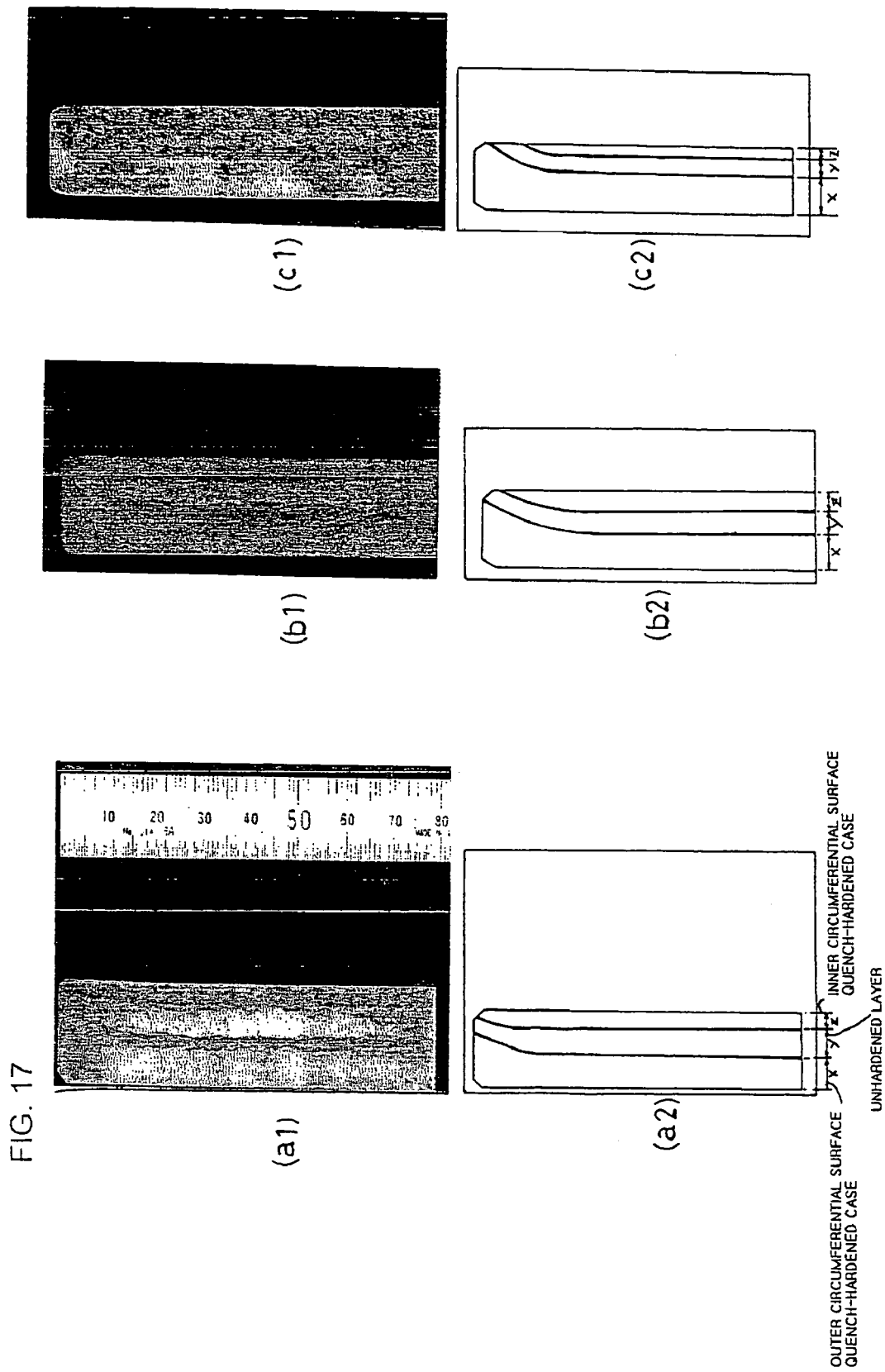
FIGS. 17(*a*1), 17(*a*2), 17(*b*1), 17(*b*2), 17(*c*1) and 17(*c*2) are photographs each showing a macro-etch structure in the vicinity of an end face flat sealing portion of the track bushing C and their explanatory diagrams.

In this example, quenching quality was checked at the flat sealing portions of both end faces of the track bushing C when quenching was carried out by use of the partition jigs described in Example 5, in the cases where the length of the thin cylindrical sections 7a, 8a (see FIG. 15) provided for the partition jigs was 10 mm and 3 mm and in the case where the thin cylindrical sections 7a, 8a were not provided. FIGS. 17(a1), 17(a2); 17(b1), 17(b2); 17(c1) and 17(c2) show, for comparison purpose, the macroscopic structures in the vicinity of both end faces of the track bushing when the length of the thin cylindrical sections is 0 mm, 3 mm and 10 mm, respectively. It is obvious from these figures that, as the length of the thin cylindrical sections of the partition jigs increases, the outer circumferential surface quench-hardened case becomes closer to the inner circumference side. Above all, where partition jigs made from asbestos and having 10 mm-long thin cylindrical sections are used, the above quench-hardened case is completely linked to the inner circumferential surface.

Figure 18:
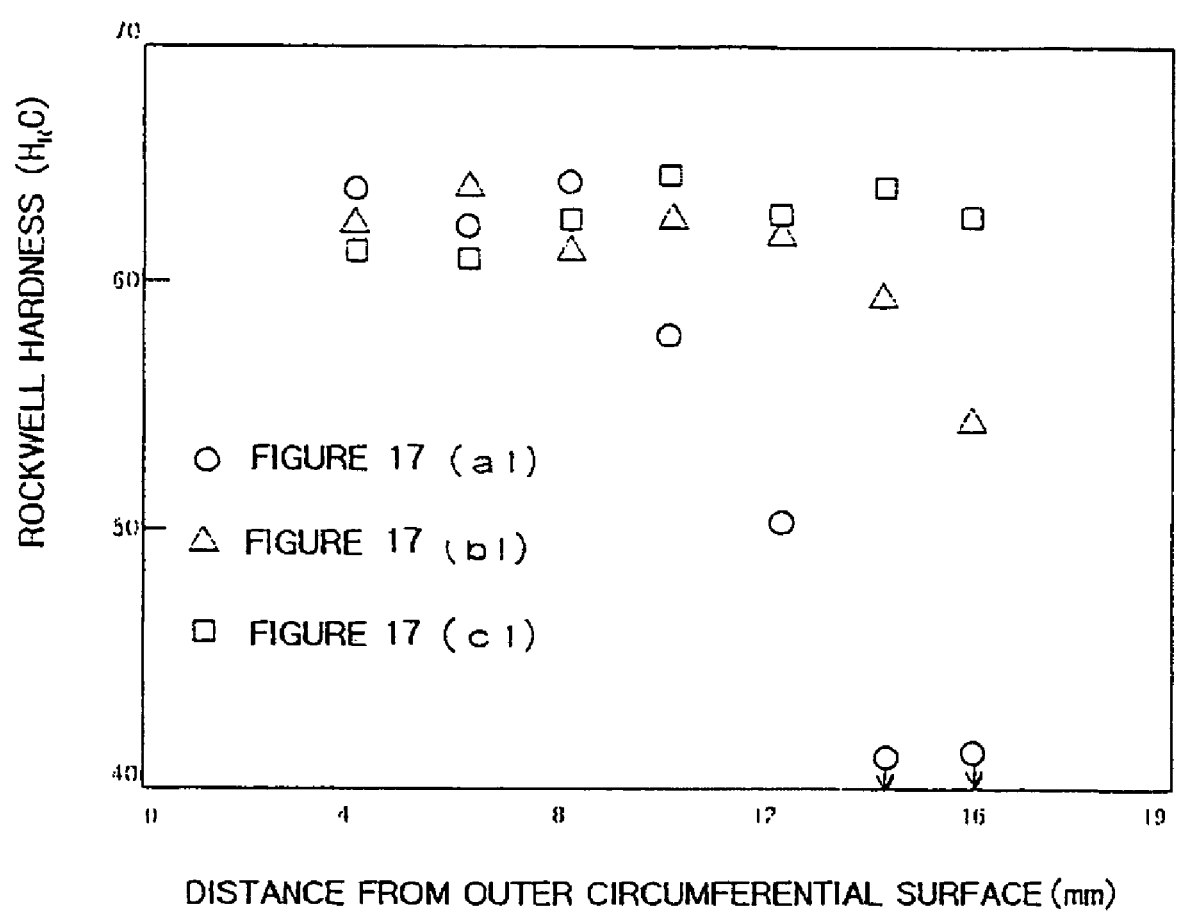
FIG. 18 shows a surface hardness distribution in the end face flat sealing portion of the track bushing C.

FIG. 18 shows the surface hardnesses of the flat sealing portions, which corresponds to FIGS. 17(a1), 17(a2) to 17(c1), 17(c2). As apparent from this result, the flat sealing portions can be quench-hardened to a depth which is equal to or more than one-half the thickness of the track bushing from the outer circumferential surface, by utilizing the cooling prevention effect of the partition jigs when preceding cooling of the inner circumferential surface is effected while carrying out additional induction heating from the outer circumferential surface.

When assembling two track bushings B so as to be overlapped, a partition jig (see FIG. 3) made from SUS304 was interposed between the track bushings. Then, the two track bushings were induction heated at the same time and subsequently, quenched under the conditions shown in Table 1. As a result, it was found that the flat sealing portions at the end faces between which the intermediate partition jig was disposed were quench-hardened similarly to the case of the track bushing C.

EXAMPLE 8

Quenching Test 3

In Example 8, the track bushing C was entirely heated under the same condition as in Example 7 and then soaking was effected by letting the track bushing C cool for 10 seconds. After additional induction heating from the outer circumferential surface and laminar flow cooling of the inner circumferential surface had been simultaneously carried out for 16 seconds, the additional heating and the inner circumferential surface cooling were interrupted for four seconds. Subsequently, cooling from the inner and outer circumferential surfaces was effected, thereby completing the quenching operation. In one case, when interrupting the inner circumferential surface cooling, air was introduced by the gas introducing valve 43 described in Example 3 in order to increase the dischargeability of the laminar flow during the interruption. In another case, air was not introduced. From a comparison between these cases, it was ascertained that only in the case where the dischargeability of the laminar flow during the interruption was increased, quench irregularities did not occur at the inner circumferential surface of the track bushing C so that excellent quality could be achieved.

Figure 19:
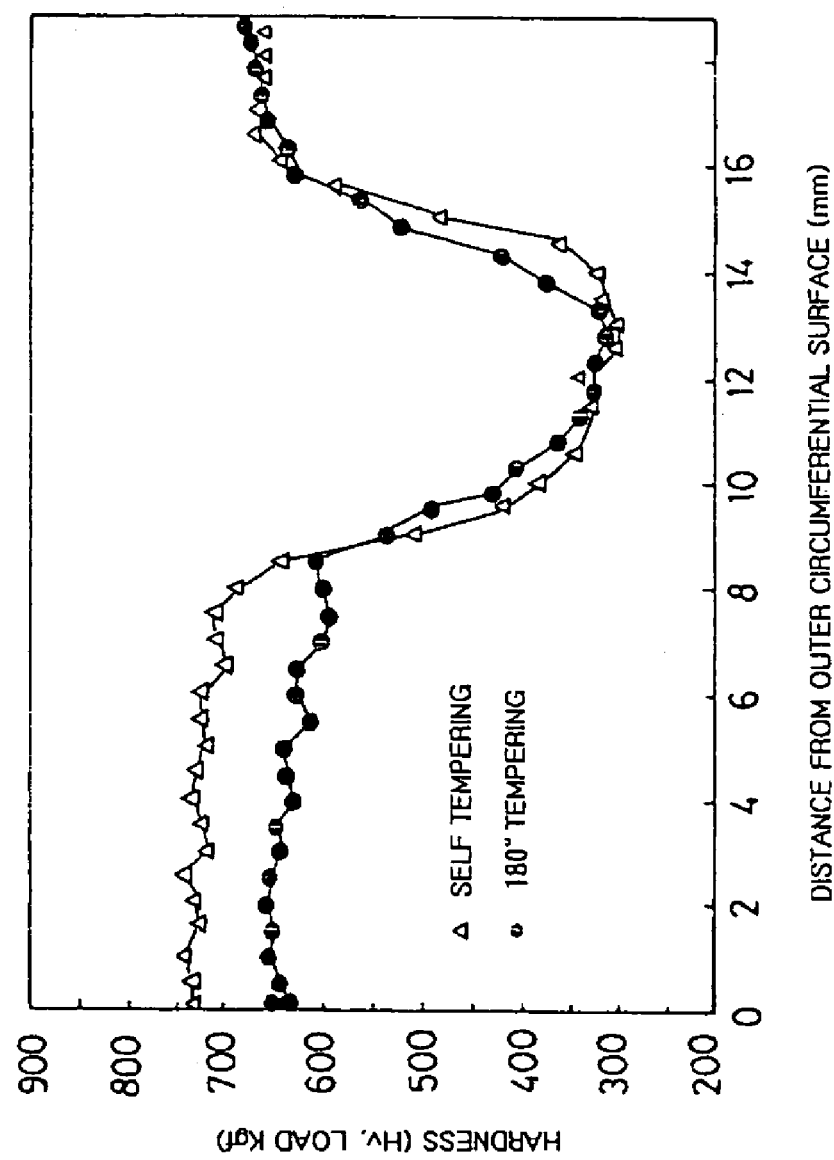
FIG. 19 is a graph showing the hardness distribution of the track bushing C self-tempered by interruption of inner circumferential surface cooling.

In FIG. 19, the hardness distribution in a thickness-wise direction at the center of the track bushing C subjected to self-tempering is shown in comparison with the distribution obtained in Example 7 in which tempering was effected at low temperature (180° C., 2 hours). It is understood from FIG. 19 that the quench-hardened case of the inner circumferential surface of the track bushing C subjected to self-tempering was slightly tempered.

EXAMPLE 9

Laminar Flow Cooling Test Conducted on Outer Circumferential Surface

In Example 9, the outer circumferential surface of the track bushing B was cooled by the laminar flow cooling.

Figure 20:
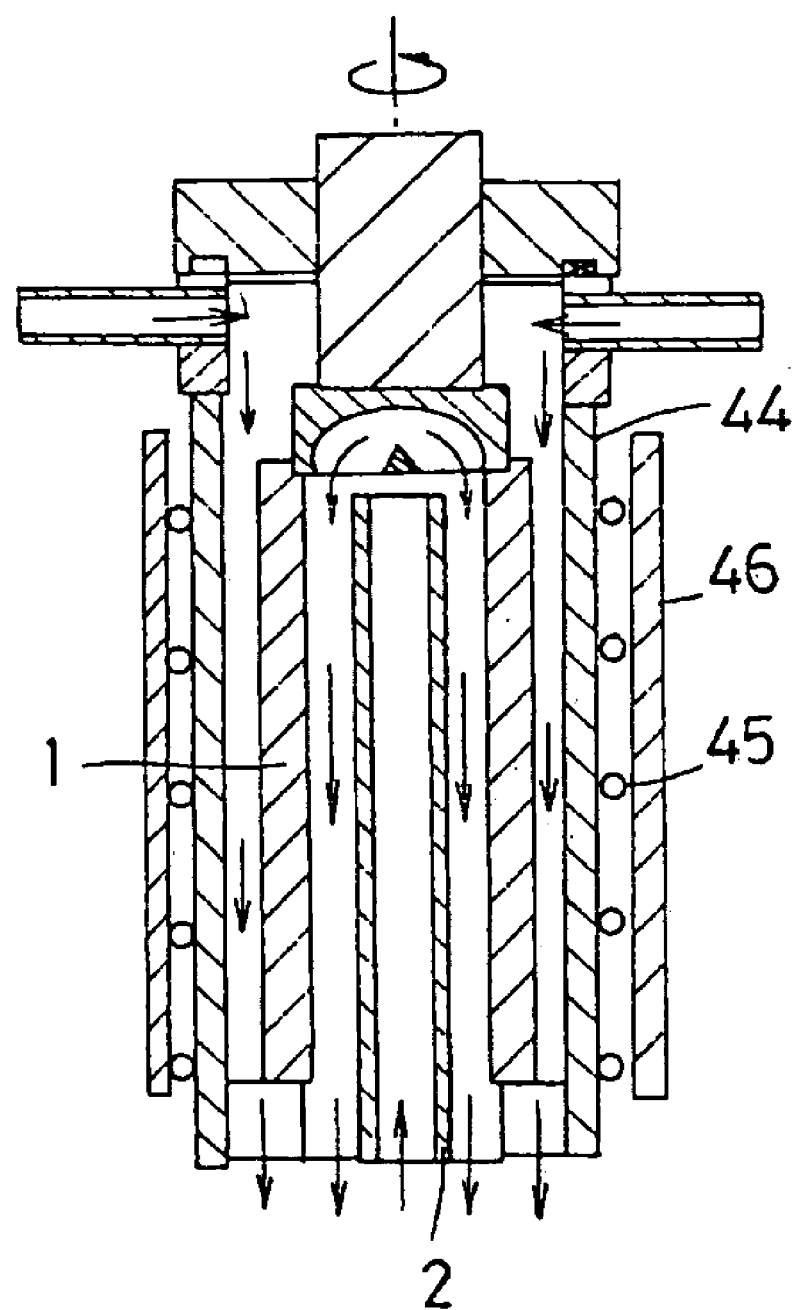
FIG. 20 is a sectional view of a quenching system for quenching the inner and outer circumferential surfaces by laminar flow cooling.

FIG. 20 shows the schematic configuration of a system for quenching inner and outer circumferential surfaces by the laminar flow cooling. This quenching system is designed such that an outer-circumference cylindrical body 44 having an inside diameter larger than the outside diameter of the track bushing 1 is disposed; a cooling medium is allowed to flow in an axial direction of the track bushing 1 between the outer circumferential surface of the track bushing 1 and the outer-circumference cylindrical body 44; and a spiral high frequency coil 45 is disposed so as to surround the outer-circumference cylindrical body 44. Herein, the outer-circumference cylindrical body 44 is made of a quartz material having a wall thickness of 5 mm. Note that reference numeral 46 designates an insulating material.

While the same cooling and heating conditions as described earlier were employed, the flow rate of water at the outer circumferential surface was 300 liters/min and the flow rate of water at the inner circumferential surface was 200 liters/min. As the result, the hardness of the outer circumferential surface was found to be the same as in quenching with the coil being displaced as shown in Table 3 of Example 7. It can be understood from this that the laminar flow cooling of the outer circumferential surface is desirable in view of the wear resistance of the track bushing and saves the investment in the equipment for coil displacement.

EXAMPLE 10

Figure 21:
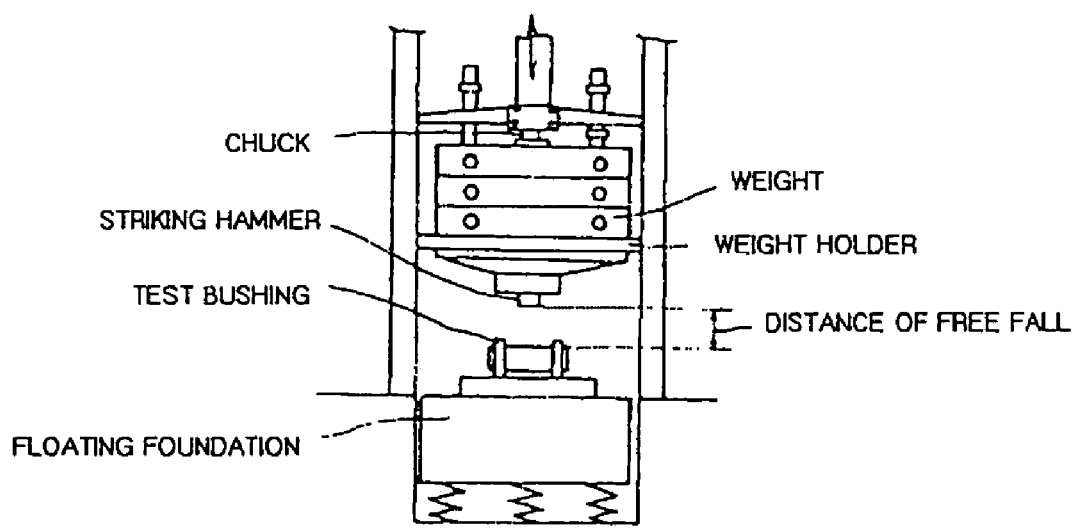
FIG. 21 is a view of an impact fatigue tester.
Figure 22:
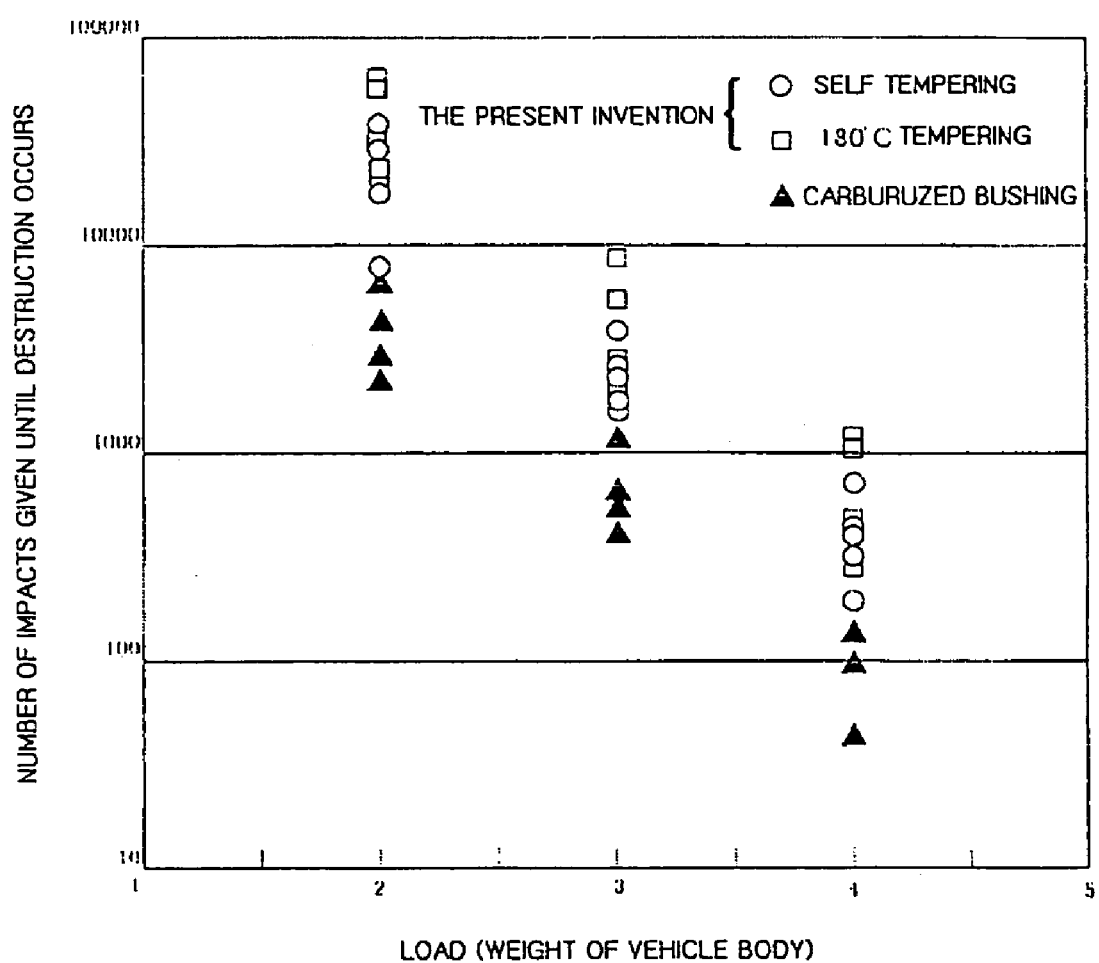
FIG. 22 shows the result of an impact fatigue test conducted on the track bushing C.
Figure 23:
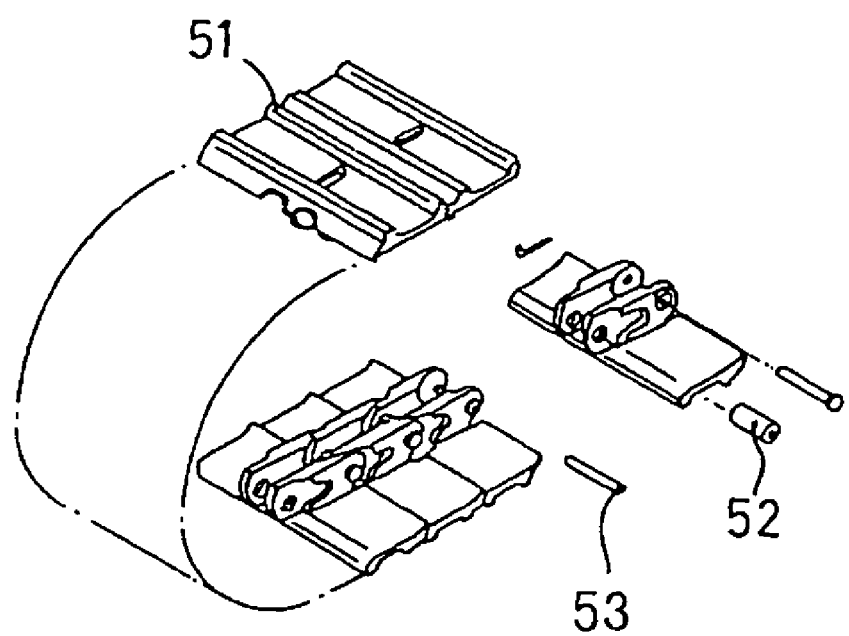
FIG. 23 is an exploded perspective view of a crawler belt.
Figure 24:
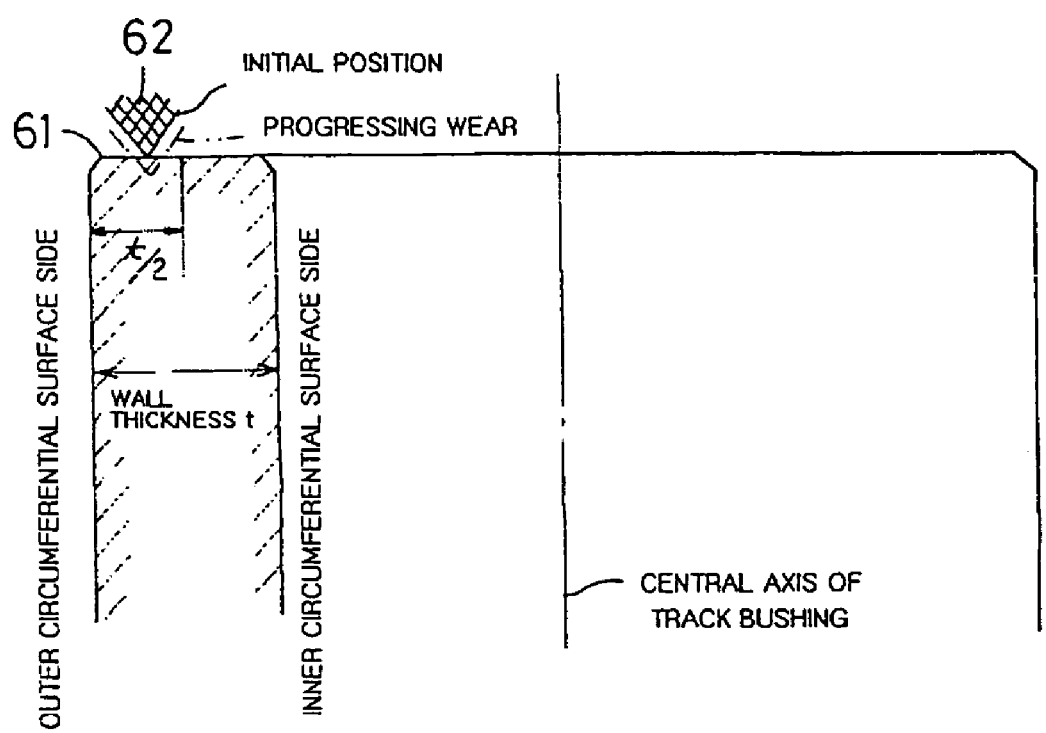
FIG. 24 illustrates a seal contact section in a flat sealing portion at an end of a track bushing.

In Example 10, the strength of the track bushing C which had undergone the thermal treatment of Example 7 and then tempering at 180° C. for two hours and the strength of the track bushing C which had undergone only self tempering of the inner circumferential surface quench-hardened case described in Example 8 were respectively measured. As a comparative example, the strength of the track bushing C prepared by carburization-quenching an SCM420 steel material and tempering it at 180° C. for two hours was checked. The impact fatigue tester shown in FIG. 21 was used in the strength evaluation. Specifically, impact loads corresponding to twice, three times and four times the weight of the vehicle (50,000 kg) were imposed on the specimens and the number of impacts given to each specimen until destruction occurred was checked. FIG. 22 shows this measurement result. As apparent from the measurement result, the track bushing according to the invention presented higher impact fatigue strength than the track bushing prepared by the conventional carburization treatment. The track bushing, whose inner circumferential surface quench-hardened case was self-tempered as described in Example 8, has also been found to be excellent in strength so that significant improvements in productivity and cost reduction can be expected thanks to the obviation of the need for another low temperature tempering treatment.

What is claimed is:

1. A track bushing producing apparatus for producing a track bushing having an inner circumferential surface defining a longitudinally-extending centrally-disposed hole with an inside diameter and an outer circumferential surface, comprising:
a quenching system capable of induction heating the track bushing material from its outer circumferential surface, wherein the quenching system has an inner circumferential surface cooling system including a tubular or cylindrical body which has an outside diameter smaller than the inside diameter of the track bushing and which is disposed inside the hole of the inner circumferential surface of the track bushing, and the inner circumferential surface cooling system has a diverting member located at the upper end of the track bushing to divert a flowing direction of a cooling medium such that the cooling medium flows in a first anti-gravitational direction along an inner circumferential surface of the tubular or cylindrical body, then flows in a second gravitational direction within a space defined by the inner circumferential surface of the track bushing and an outer circumferential surface of the tubular or cylindrical body while rotating the track bushing to cool the inner circumferential surface of the track bushing by a laminar flow.

2. The track bushing producing apparatus according to claim 1, wherein the inner circumferential surface cooling system comprises a gas introducing valve for discharging the cooling medium outwardly from the track bushing while the inner circumferential surface cooling being suspended, the cooing medium flowing within the space defined by the guide tube and the inner circumferential surface of the track bushing.

3. The track bushing producing apparatus according to claim 1 or 2 wherein the guide tube for introducing the cooling medium is formed from ceramics materials such as $Si_3N_4$, $Al_2O_3$ and $SiO_2$ which hardly generate heat in induction heating or antiferromagnetic alloys such as Fe—30 to 50 at % Mn alloys.

4. The track bushing producing apparatus according to claim 1, wherein the quenching system is designed such that an insulating material surrounding the track bushing is provided at at least the bore side or periphery side of a coil for additional induction heating, and/or such that the outer circumferential surface of a guide tube for introducing the cooling medium for the inner circumferential surface is coated with an insulating material.

5. The track bushing producing apparatus according to claim 1, wherein the quenching system includes a detector for monitoring and controlling the temperature of the outer circumferential surface of the track bushing at a start of outer circumferential surface cooling.

6. The track bushing producing apparatus according to claim 1, wherein the cooling medium is water.

* * * * *

UNITED STATES PATENT AND TRADEMARK OFFICE
CERTIFICATE OF CORRECTION

| | | |
|---|---|---|
| PATENT NO. | : 7,282,173 B2 | Page 1 of 1 |
| APPLICATION NO. | : 11/367424 | |
| DATED | : October 16, 2007 | |
| INVENTOR(S) | : Takemori Takayama et al. | |

It is certified that error appears in the above-identified patent and that said Letters Patent is hereby corrected as shown below:

<u>Column 35:</u>
Line 19, "cooing" should read -- cooling --.

Signed and Sealed this

Twentieth Day of May, 2008

JON W. DUDAS
*Director of the United States Patent and Trademark Office*